United States Patent [19]
Aoshima

[11] Patent Number: 5,953,550
[45] Date of Patent: Sep. 14, 1999

[54] SHUTTER DEVICE OF CAMERA

[75] Inventor: Chikara Aoshima, Kanagawa-ken, Japan

[73] Assignee: Canon Kabushiki Kaisha, Tokyo, Japan

[21] Appl. No.: 08/898,796

[22] Filed: Jul. 23, 1997

Related U.S. Application Data

[63] Continuation of application No. 08/287,846, Aug. 9, 1994, abandoned.

[30] Foreign Application Priority Data

Oct. 8, 1993 [JP] Japan ................................. 5-198213
Feb. 8, 1994 [JP] Japan ................................. 6-181288

[51] Int. Cl.$^6$ .............................. G03B 9/00; G03B 9/08; G03B 9/10; G03B 9/58
[52] U.S. Cl. ...................... 396/458; 396/469; 396/478; 396/493; 396/497
[58] Field of Search ................................ 354/230, 234.1, 354/236, 439, 452, 264, 261, 250, 233; 396/452, 472, 473, 475, 478, 493, 497, 469, 463, 451, 462, 458, 459, 460

[56] References Cited

U.S. PATENT DOCUMENTS

| | | | |
|---|---|---|---|
| 2,322,733 | 6/1943 | Steiner | 95/56 |
| 2,347,699 | 5/1944 | Magnus et al. | 95/53 |
| 3,575,097 | 4/1971 | Gonzalez | 95/60 |
| 4,005,448 | 1/1977 | Iwata et al. | 354/30 |
| 4,333,721 | 6/1982 | Yoshima et al. | 354/234 |
| 4,373,797 | 2/1983 | Shimada et al. | 354/234 |
| 4,417,797 | 11/1983 | Senuma | 354/234 |
| 4,458,998 | 7/1984 | Tanaka et al. | 354/154 |
| 4,464,032 | 8/1984 | Kiuchi et al. | 354/234.1 |
| 4,754,151 | 6/1988 | Billard | 250/574 |
| 5,117,137 | 5/1992 | Kobayashi | 310/49 R |
| 5,164,766 | 11/1992 | Morita | 355/71 |
| 5,202,721 | 4/1993 | Kobayashi et al. | 354/441 |
| 5,327,185 | 7/1994 | Nakagawa | 354/228 |
| 5,355,166 | 10/1994 | Date et al. | 358/336 |
| 5,384,506 | 1/1995 | Aoshima | 310/49 R |
| 5,489,960 | 2/1996 | Tanabe et al. | 354/242 |
| 5,497,208 | 3/1996 | Sato et al. | 354/234.1 |
| 5,658,070 | 8/1997 | Rowe et al. | 362/283 |

*Primary Examiner*—Safet Metjahic
*Assistant Examiner*—Christopher E. Mahoney
*Attorney, Agent, or Firm*—Robin, Blecker & Daley

[57] ABSTRACT

A shutter device includes first and second light blocking members arranged to be movable to vary the amounts of opening. First and second motors are arranged to drive respectively the first and second light blocking members, and a control circuit is arranged to individually control the driving actions of the first and second motors.

12 Claims, 19 Drawing Sheets

F I G.23
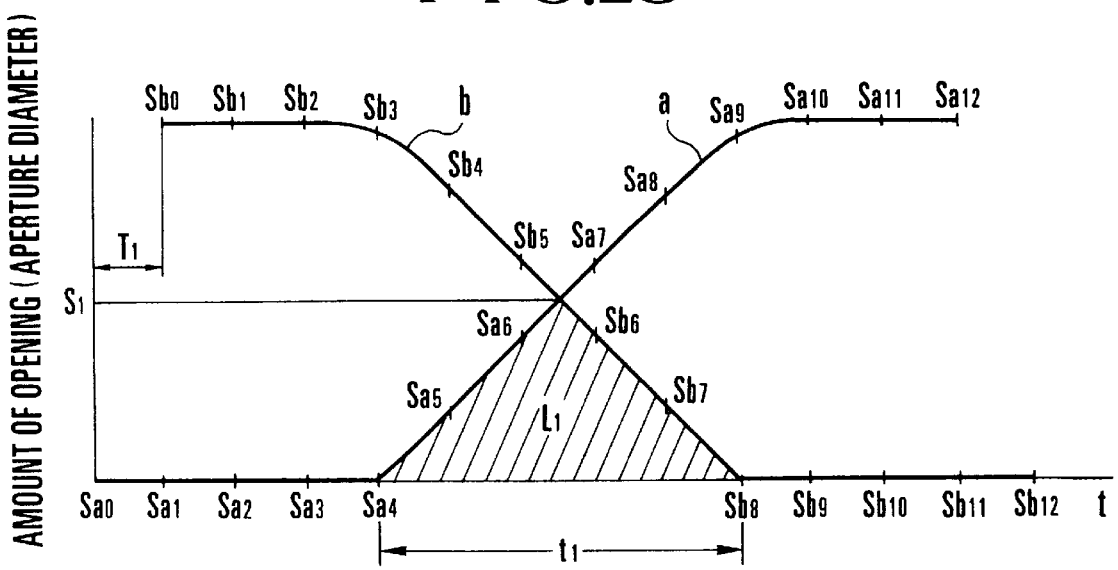
F I G.24
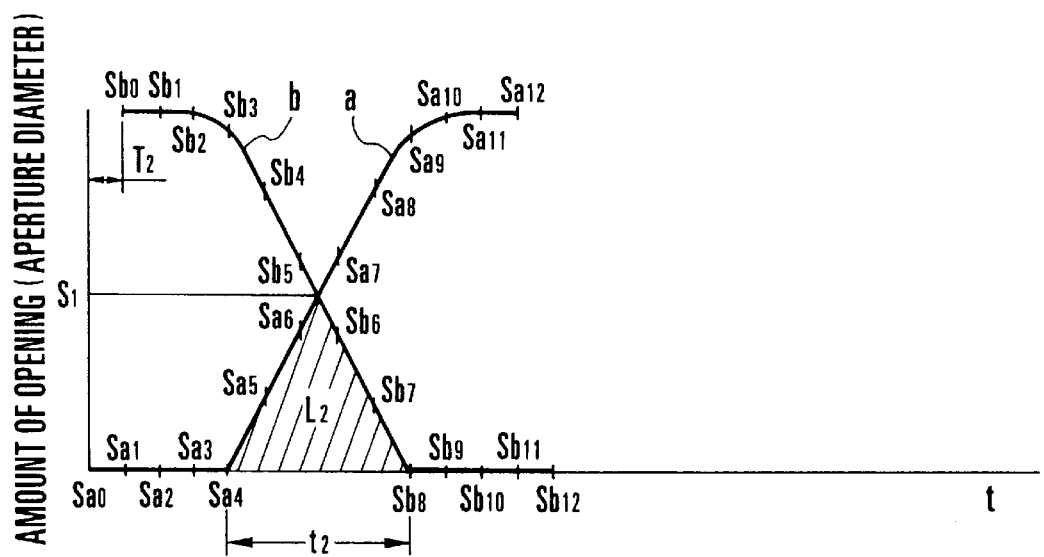

SHUTTER DEVICE OF CAMERA

This is a continuation application under 37 CFR 1.62 of prior application Ser. No. 08/287,846 filed on Aug. 9, 1994 (aban.)

BACKGROUND OF THE INVENTION

1. Field of the Invention

This invention relates to a shutter device for a camera and more particularly to a motor-driven shutter.

2. Description of the Related Art

Programmed shutters of the kind having sectors which form a lens aperture, a stepping motor which rotates stepwise forward or backward according to the phase sequence of driving pulses time-serially supplied, a transmission gear train which transmits the rotation of the stepping motor to the sectors and an arrangement for controlling the opening and closing of the sectors through the rotation of the stepping motor, have been known from, for example, Japanese Utility Model Publication No. HEI 4-47697, Japanese Patent Application Laid-Open No. HEI 3-184029, Japanese Utility Model Laid-Open No. SHO 62-89624, Japanese Patent Application Laid-Open No. SHO 57-150829 (corresponding to U.S. Pat. No. 4,325,614), etc.

Generally, however, the stepping motors such as the motors employed in the prior art examples mentioned above do not permit to increase their rotation speed at the start of driving and at the time of change-over from forward rotation to backward rotation. The speed of the sectors thus cannot be increased at such a time. This shortcoming of the stepping motor has necessitated use of only a half-open area of the aperture when it is necessary to obtain a high shutter speed for a high luminance field.

A shutter permitting use of only the half-open area for a high luminance field presents problems in that the intrinsic power of a photo-taking lens cannot be fully used and that, in the event of fill-in flash photography, the exposure interlocking (synchronizing) distance of the flash device becomes nearer.

To solve these problems, it has been contrived to arrange a shutter device to include a first shutter which is normally closed and a second shutter which is normally open, to open the first shutter and close the second shutter by energizing them in such a way as to cause the second shutter to cover an aperture formed by the first shutter and to obtain a required amount of exposure by electrically controlling the points of time at which the first and second shutters respectively begin to operate.

However, in order to obtain a high shutter speed even for the full open area of the aperture, the shutter device of this kind necessitates increasing also the shutter operating speed. Unevenness in length of time required before the actual start of operation of the first and second shutters after receipt of an operation start signal results in an error in the amount of exposure. Particularly, since the conventional shutter device uses an electromagnetic device as a drive source for driving the shutters, the unevenness in operation start time is great and further increases accordingly as the shutter speed increases to give a greater error in amount of exposure for a high shutter speed.

SUMMARY OF THE INVENTION

This invention is directed to the solution of the above-stated problems of the prior art. Therefore, it is one aspect of this invention that a shutter device or a camera having the shutter device is arranged according to this invention to be capable of operating at a high shutter speed. The shutter device according to this invention includes a first light blocking member movable for varying an amount of opening, a first motor arranged to drive the first light blocking member, a second light blocking member movable for varying an amount of opening, a second motor arranged to drive the second light blocking member, and control means for controlling the first motor and the second motor. The first and second light blocking members are thus arranged to be driven by the respective independent motors, so that the shutter device can be operated at a high speed by these motors.

Another aspect of this invention lies in that a shutter device according to this invention has a plurality of light blocking members movable for varying an amount of opening and driving means for driving the plurality of light blocking means, wherein the plurality of light blocking members have an area in which to be driven by the driving means without changing a relative position between the plurality of light blocking members, so that the shutter device can be stably operated.

These and other aspects and features of this invention will become apparent from the following detailed description of embodiments thereof taken in connection with the accompanying drawings.

BRIEF DESCRIPTION OF THE DRAWINGS

FIG. 23 is a graph showing the characteristic of the aperture in the fourth embodiment.

FIG. 24 is a graph showing the characteristic of the aperture in the fourth embodiment.

DETAILED DESCRIPTION OF THE PREFERRED EMBODIMENTS

Figure 1:
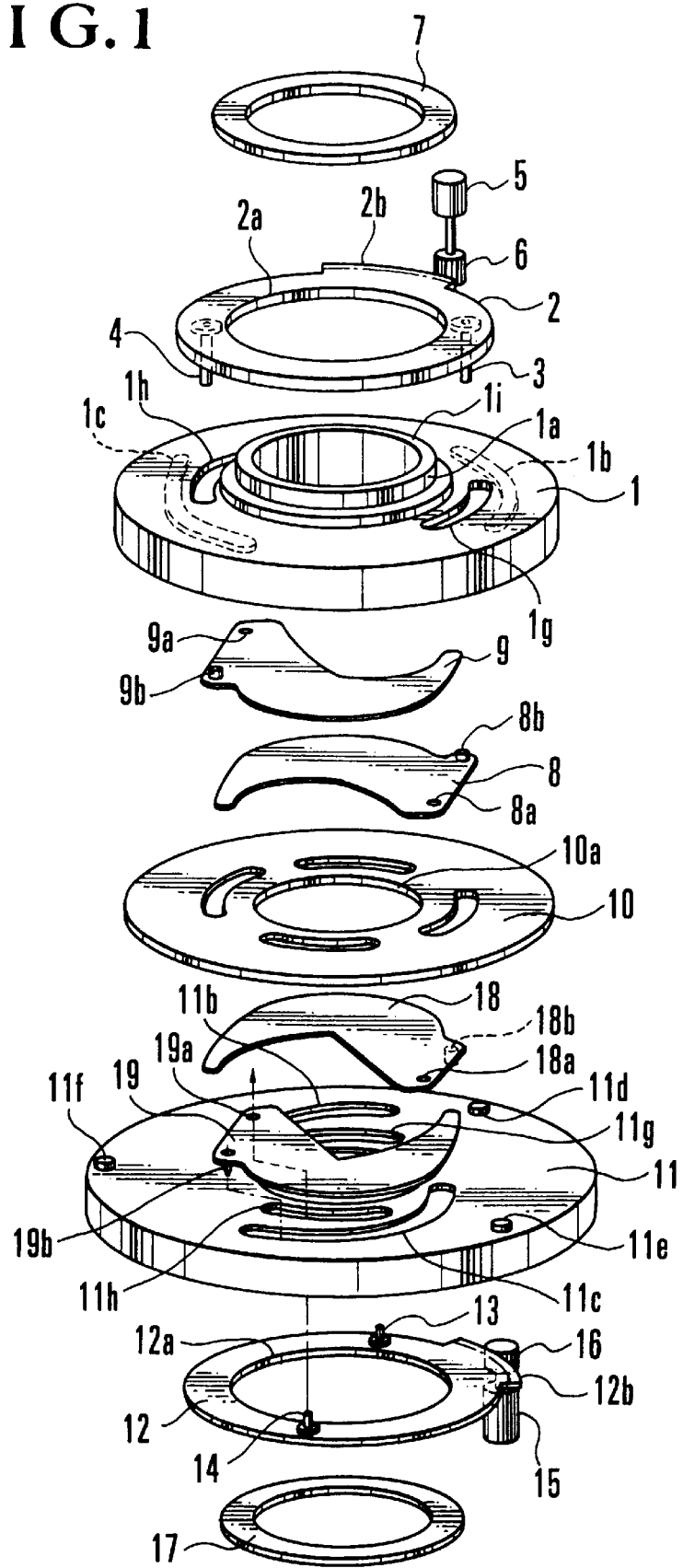
FIG. 1 is an exploded oblique view showing the essential parts of a first embodiment of this invention.
Figure 2:
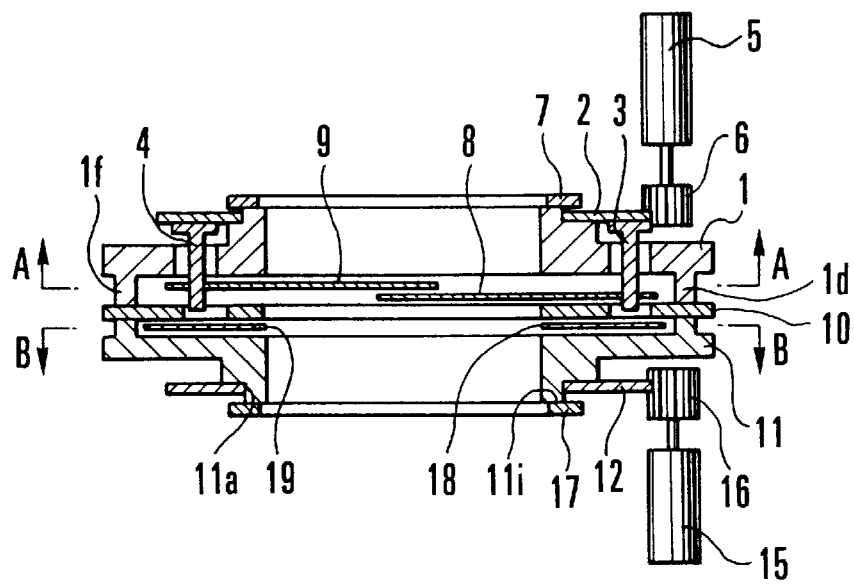
FIG. 2 is a sectional view of the embodiment.

FIGS. 1 to 13 show a first embodiment of this invention. FIG. 1 is an exploded oblique view showing the relation of component parts. FIG. 2 is a sectional view.

In these drawings, reference numeral 1 denotes an upper base plate. A first driving ring 2 has an inner diameter 2a, which is rotatably fitted into a cylindrical part 1a formed in the middle part of the upper base plate 1. Driving pins 3 and 4 are secured to the first driving ring 2. A first stepping motor 5 is of a known kind and is arranged to be rotatable at a predetermined rotation angle in an indexed manner. A first pinion 6 is secured to the output shaft of the first stepping motor 5 and is in mesh with a gear part 2b of the first driving ring 2. The first pinion 6 is thus arranged to transmit a rotatory driving force of the first stepping motor 5 to the first driving ring 2. A first retaining plate 7 is secured to the top surface 1i of the cylindrical part 1a of the upper base plate 1 after the first driving ring 2 is fitted on the cylindrical part 1a, so that the first driving ring 2 can be prevented from coming off the upper base plate 1.

A first shutter blade 8 has a hole 8a. The driving pin 3 mentioned above is rotatably fitted into the hole 8a through a slot 1g formed in the upper base plate 1. A pin 8b is secured to the first shutter blade 8 and is slidably fitted in a cam groove 1b formed in the upper base plate 1. A second shutter blade 9 has a hole 9a. The driving pin 4 which is also mentioned above is fitted into the hole 9a through a slot 1h formed in the upper base plate 1. A pin 9b is secured to the second shutter blade 9 and is slidably fitted into a cam groove 1c which is formed also in the upper base plate 1.

A blade retaining plate 10 has an aperture part 10a and is attached to the upper base plate 1, leaving an air gap between the upper base plate 1 and the blade retaining plate 10. The air gap is deep enough for allowing the first and second shutter blades 8 and 9 to move in the planar direction of these plates 10 and 1. The upper base plate 1 has dowels 1f, 1d and 1e which protrude to give the above-stated air gap between the upper base plate 1 and the blade retaining plate 10.

The illustrations further include a lower base plate 11 and a second driving ring 12. The inner diameter part 12a of the second driving ring 12 is rotatably fitted on a cylindrical part 11a which is formed in the middle part of the lower base plate 11. Driving pins 13 and 14 are secured to the second driving ring 12. A second stepping motor 15 which is also of the known kind is arranged to be rotatable at a predetermined rotation angle in an indexed manner. A second pinion 16 is secured to the output shaft of the second stepping motor 15 and is in mesh with a gear part 12b of the second driving ring 12. The pinion 16 is thus arranged to transmit the rotatory driving force of the second stepping motor 15 to the second driving ring 12. A second retaining plate 17 is fitted on the cylindrical part 11a of the second driving ring 12 and, after that, is secured to the top part 11i of the cylindrical part 11a to prevent the second driving ring 12 from coming off the lower base plate 11.

A third shutter blade 18 is provided with a hole 18a. The above-stated driving pin 13 is rotatably fitted into the hole 18a through a slot 11g formed in the lower base plate 11. A pin 18b is secured to the third shutter blade 18 and is slidably fitted into a cam groove 11b which is formed in the lower base plate 11.

A fourth shutter blade 19 has a hold 19a. The above-stated driving pin 14 is rotatably fitted into the hole 19a through a slot 11h formed in the lower base plate 11. A pin 19b which is secured to the fourth shutter blade 19 is slidably fitted into a cam groove 11c formed in the lower base plate 11.

The third and fourth shutter blades 18 and 19 are mounted on the blade retaining plate 10 within an air gap which is left between the blade retaining plate 10 and the lower base plate 11. The air gap is kept to be deep enough for allowing the third and fourth shutter blades 18 and 19 to move in the planar direction of these plates 10 and 11. The lower base plate 11 has dowels 11f, 11d and 11e which are arranged to secure the air gap between the blade retaining plate 10 and the lower base plate 11.

Figure 3:
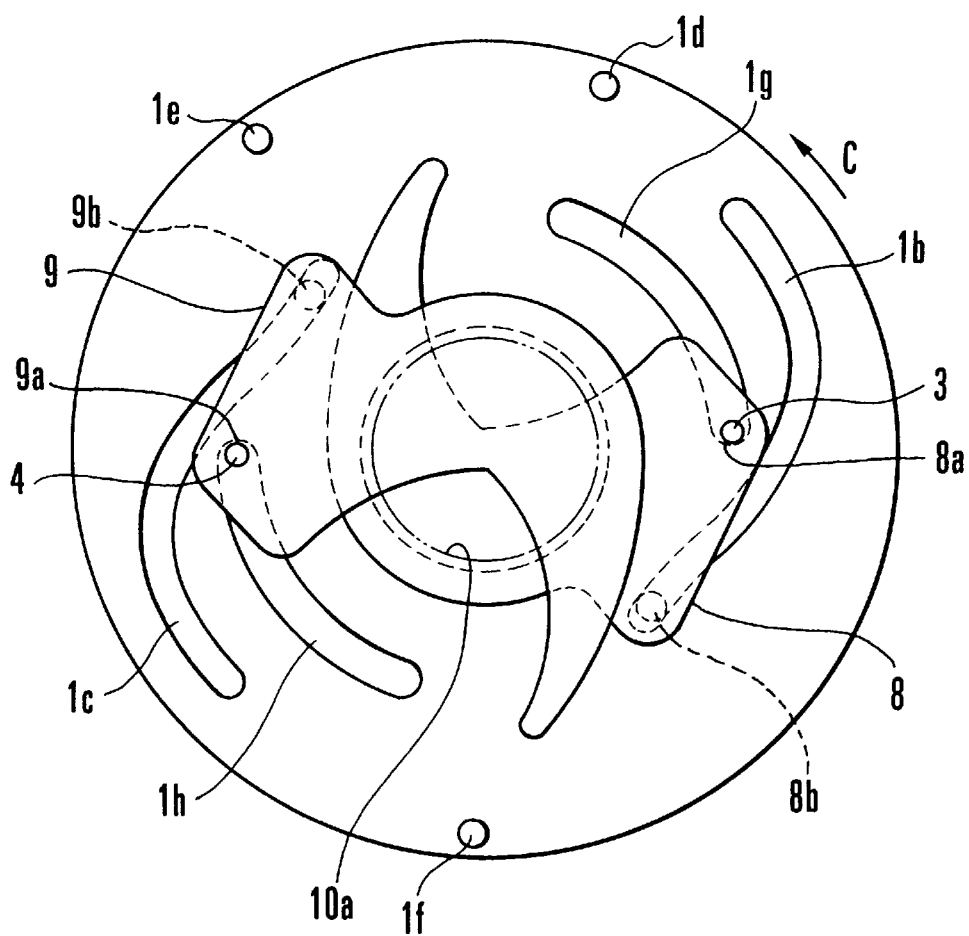
FIG. 3 is a cross-sectional view taken along a line A—A indicated in FIG. 2.

FIG. 3 is a sectional view taken along a line A—A shown in FIG. 2. In FIG. 3, the embodiment is shown in a state of having an aperture closed by the first and second shutter blades 8 and 9. Under this condition, when the first driving ring 2 is rotated in the direction of arrow c, the first and second shutter blades 8 and 9 rotate around an optical axis. Then, since the pins 8b and 9b of the first and second shutter blades 8 and 9 are fitted in the cam grooves 1b and 1c, the first shutter blade 8 rotates around its hole 8a and the second shutter blade 9 rotates around its hole 9a in such a way as to form an aperture.

Figure 4:
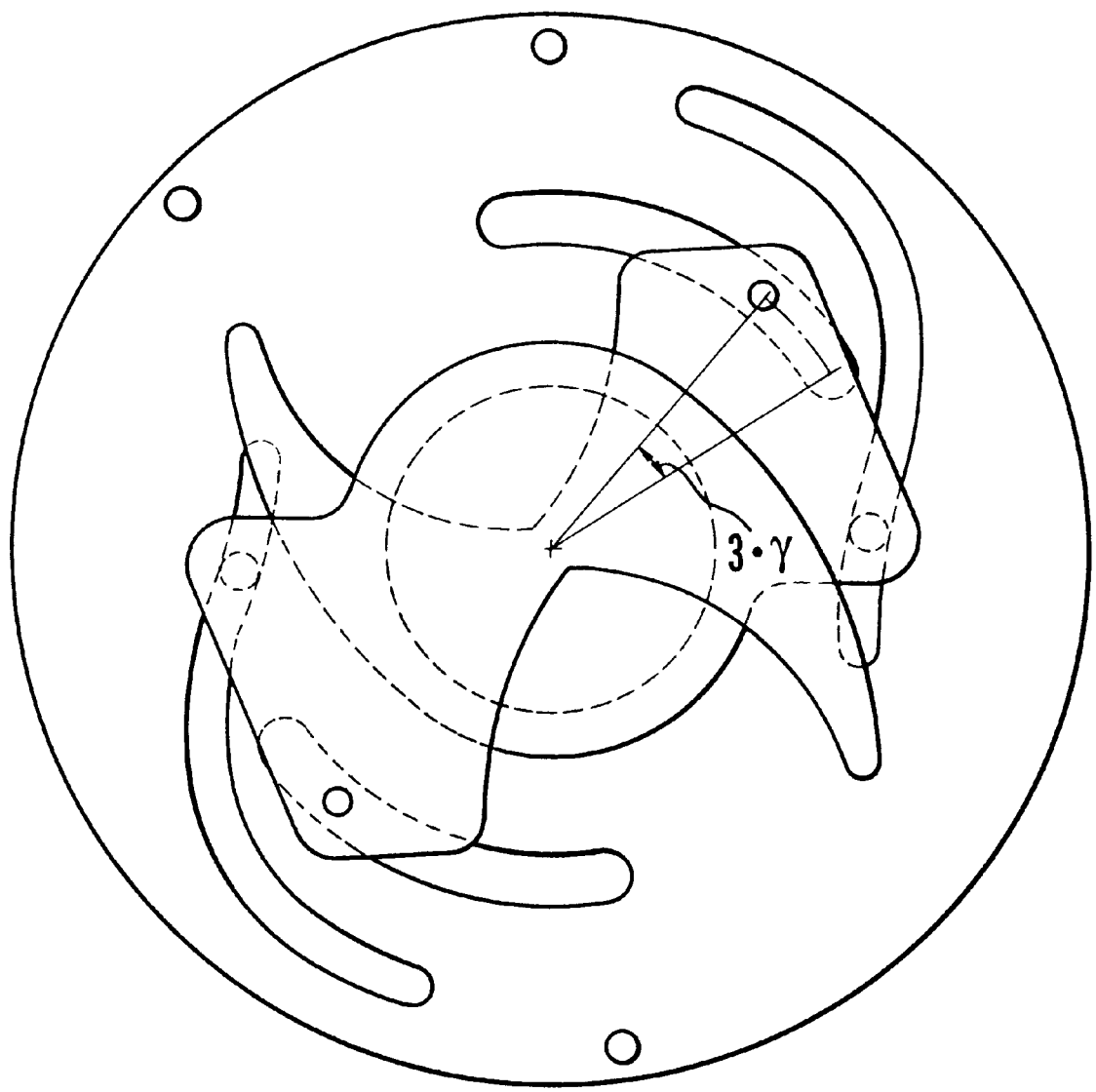
FIG. 4 is a plan view showing a sector device of FIG. 1 in a state obtained after a first stepping motor has been driven three steps.
Figure 5:
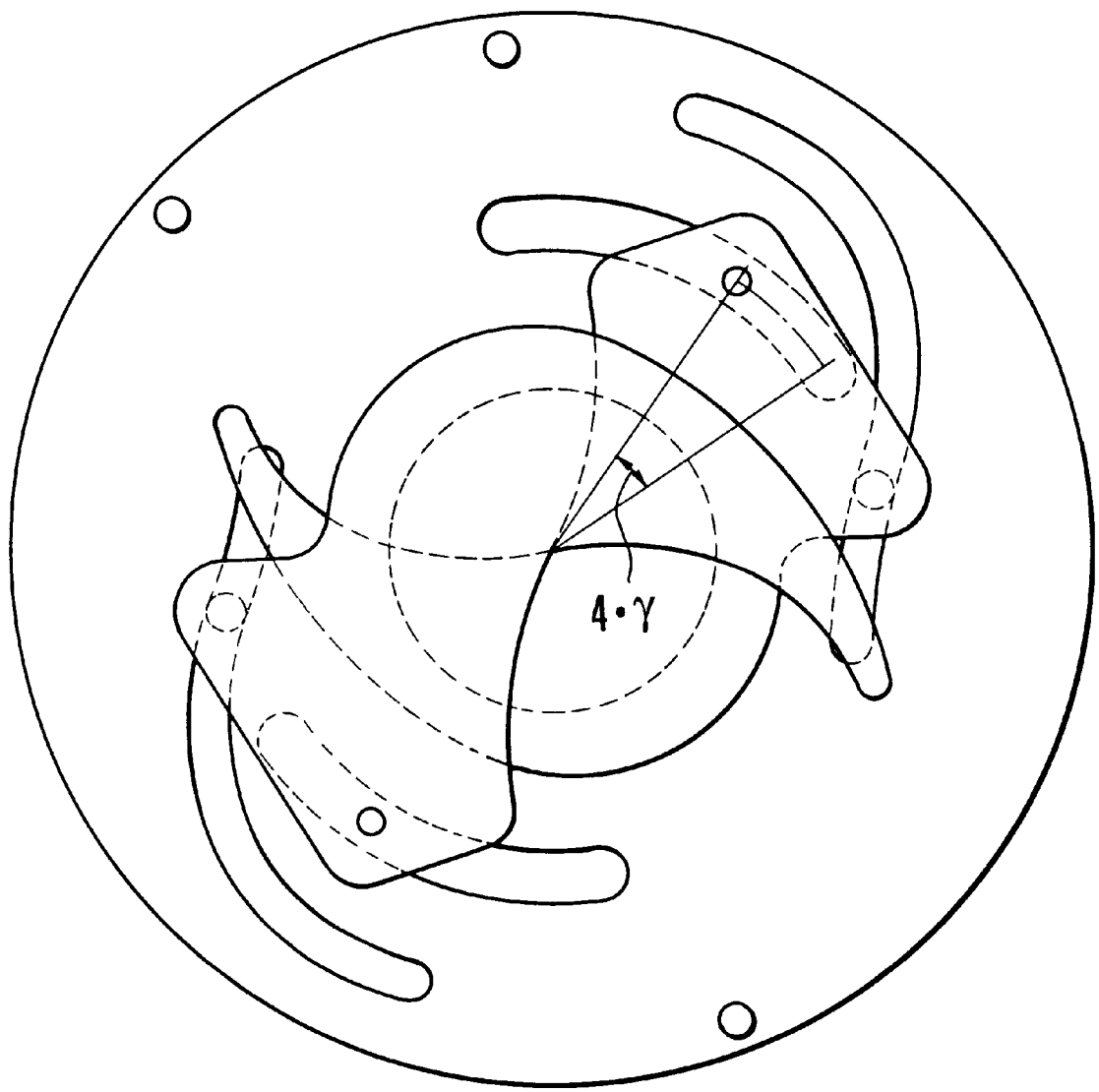
FIG. 5 is a plan view showing the sector device of FIG. 1 in a state obtained after the first stepping motor has been driven four steps.
Figure 6:
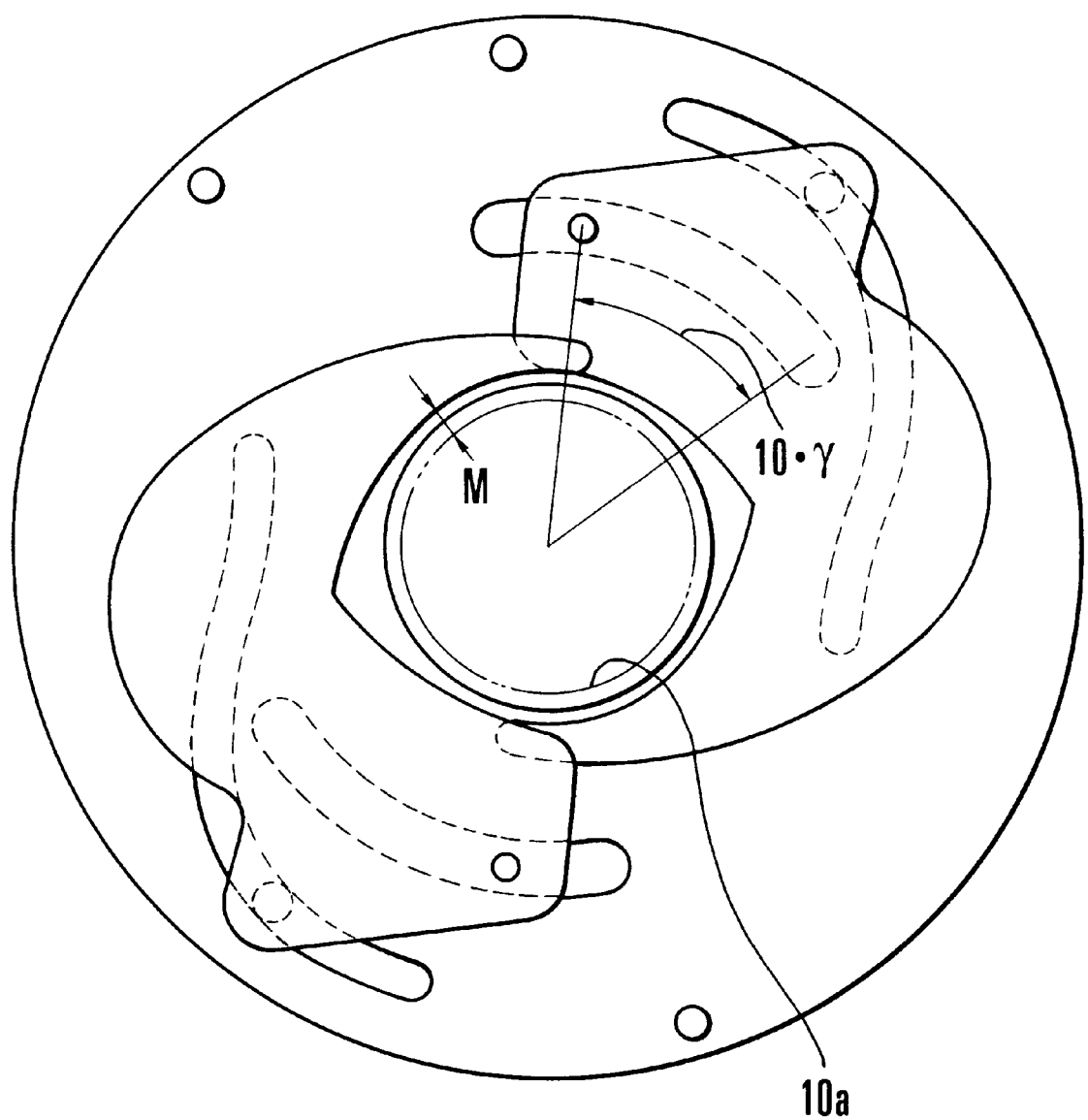
FIG. 6 is a plan view showing the sector device of FIG. 1 in a state obtained after the first stepping motor has been driven ten steps.

The first driving ring 2 is arranged to rotate around the optical axis as much as an angle γ when the first stepping motor 5 is driven to an extent which corresponds to one step. The cam grooves 1b and 1c are arranged such that, even if the first driving ring 2 is rotated as much as 3·γ from its position shown in FIG. 3, i.e., even if the first stepping motor 5 is driven by three steps, the first and second shutter blades 8 and 9 are not caused to rotate around the holes 8a and 9a, as shown in FIG. 4. In other words, the first and second shutter blades 8 and 9 move together without changing a relative position between them. However, further driving steps of the first stepping motor 5 cause the first and second shutter blades 8 and 9 to rotate around the optical axis and, at the same time, rotate around their holes 8a and 9a along the cam grooves 1b and 1c. At the fourth step of the first stepping motor 5, i.e., when the first driving ring 2 comes to a rotating position of 4·γ from its initial position, an aperture formed by the first and second shutter blades 8 and 9 becomes a pinhole, as shown in FIG. 5. At the tenth step of the first stepping motor 5, i.e., when the first driving ring 2 comes to a rotating position of 10·γ from its initial position, the aperture formed by the first and second shutter blades 8 and 9 is in a full open state. This state is shown in FIG. 6.

Figure 7:
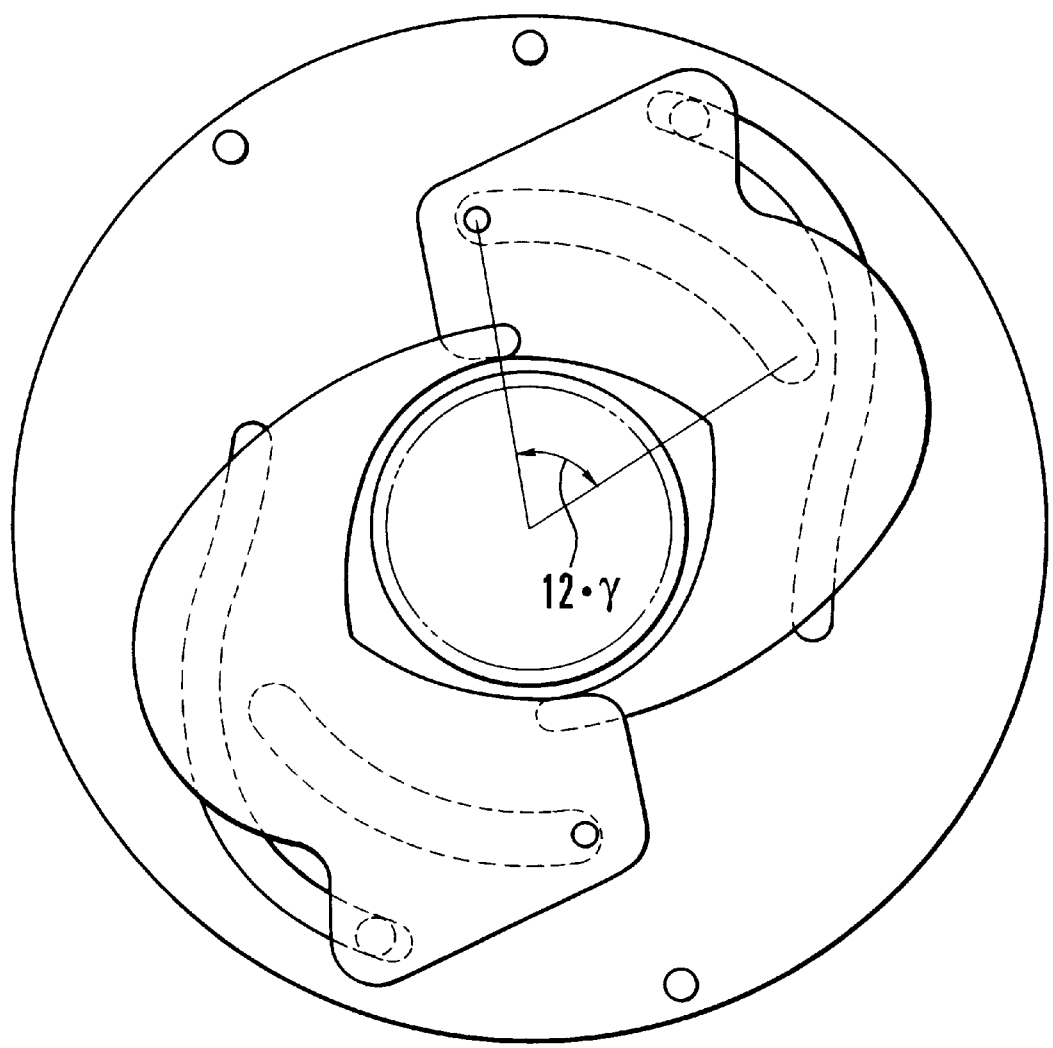
FIG. 7 is a plan view showing the sector device of FIG. 1 in a state obtained after the first stepping motor has been driven twelve steps.

The cam grooves 1b and 1c are formed in such a manner that, at steps after the tenth step of the stepping motor 5, the first and second shutter blades 8 and 9 do not rotate around their holes 8a and 9a but rotates around the optical axis together with the first driving ring 2. The first driving ring 2 comes to its last rotating position when the first stepping motor 5 comes to the twelfth step, as shown in FIG. 7.

Figure 8:
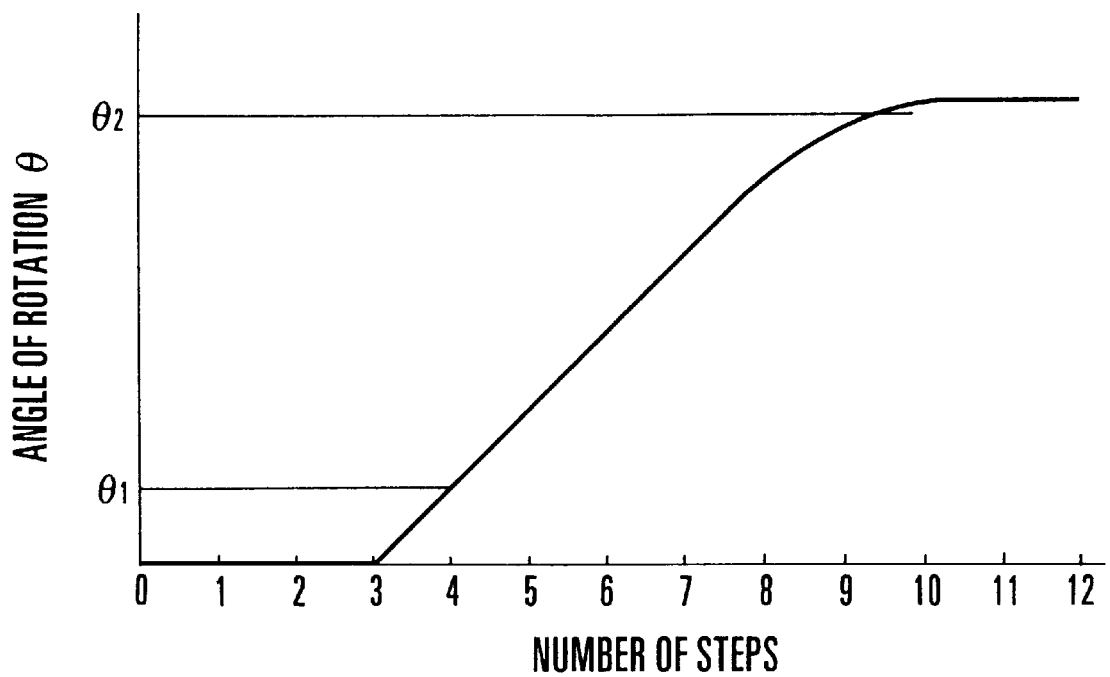
FIG. 8 is a graph showing the rotation angle of the blades of the sector device of FIG. 1 in relation to the number of steps of driving the stepping motor.

FIG. 8 is a graph showing a relation between the angle Θ of rotation of the first and second shutter blades 8 and 9 made around their holes 8a and 9a and the number of steps taken by the first stepping motor 5. The first and second shutter blades 8 and 9 form a pinhole when their rotation angle Θ is Θ1 and form a full open aperture when their rotation angle Θ is Θ2.

Figure 9:
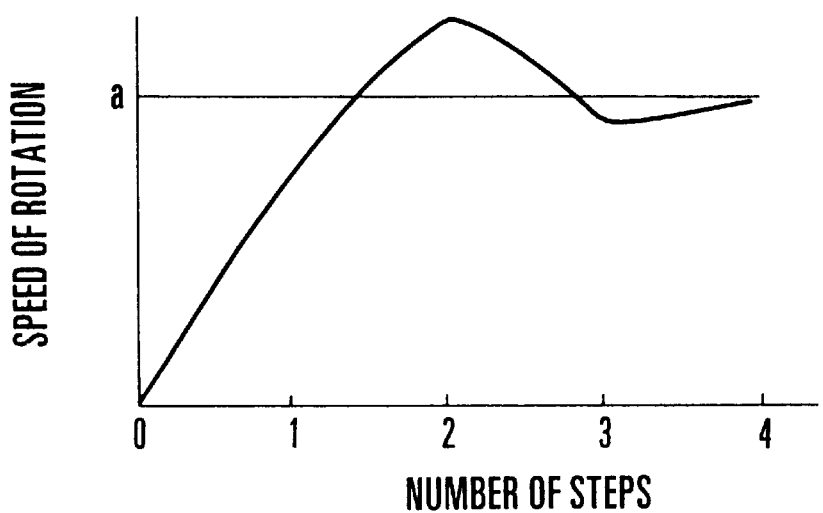
FIG. 9 is a graph showing the characteristic of the stepping motor.

FIG. 9 is a graph showing the characteristic of the stepping motor. The stepping motor does not instantly respond to a driving electrical signal when this signal is inputted for causing the stepping motor to rotate, for example, at a rotating speed "a". A certain number of steps are necessary before the rotating speed of the stepping motor reaches the speed "a".

In the case of this embodiment, the shutter is arranged to be opened by the steps after the fourth step of the first stepping motor 5. Therefore, an error of the shutter opening speed with respect to a speed set by the electrical signal is reduced to a very small value by virtue of this arrangement. Further, the arrangement according to this invention is not limited to the numbers of steps mentioned above.

As shown in FIG. 6, the amount M of escape of the shutter blades 8 and 9 from a full-open aperture defining position 10a is arranged to be small after the full open state of the aperture is attained. However, the first and second shutter blades 8 and 9 are effectively prevented from bouncing back into the inner side of the position 10a, by the arrangement of allowing the shutter blades 8 and 9 to travel until the twelfth step as shown in FIG. 7.

The arrangement of a sector device described above including the first and second shutter blades 8 and 9, the first driving ring 2 and the first stepping motor 5 will hereinafter be called a first sector device.

Figure 10:
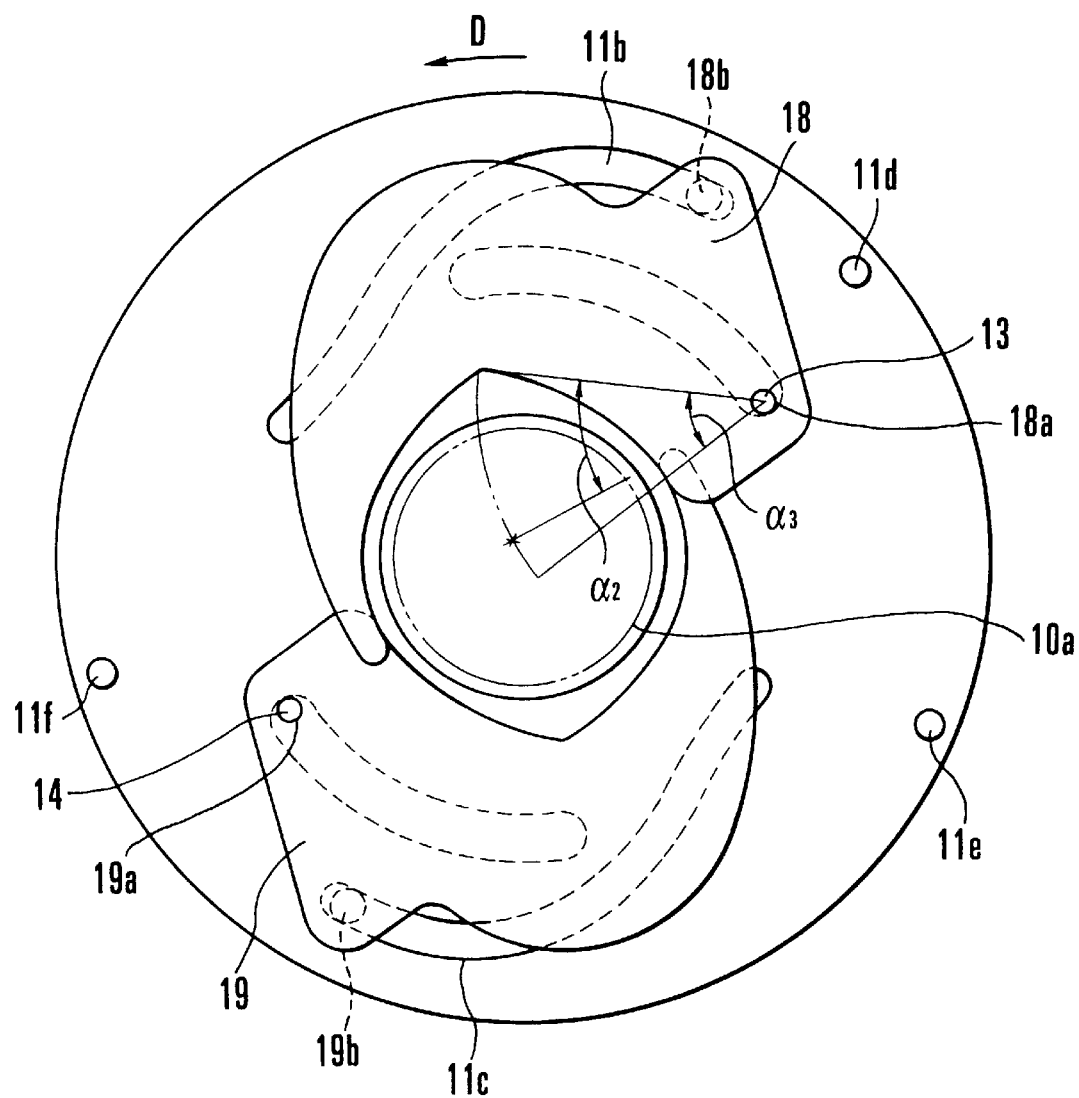
FIG. 10 is a cross-sectional view taken along a line B—B indicated in FIG. 2.
Figure 11:
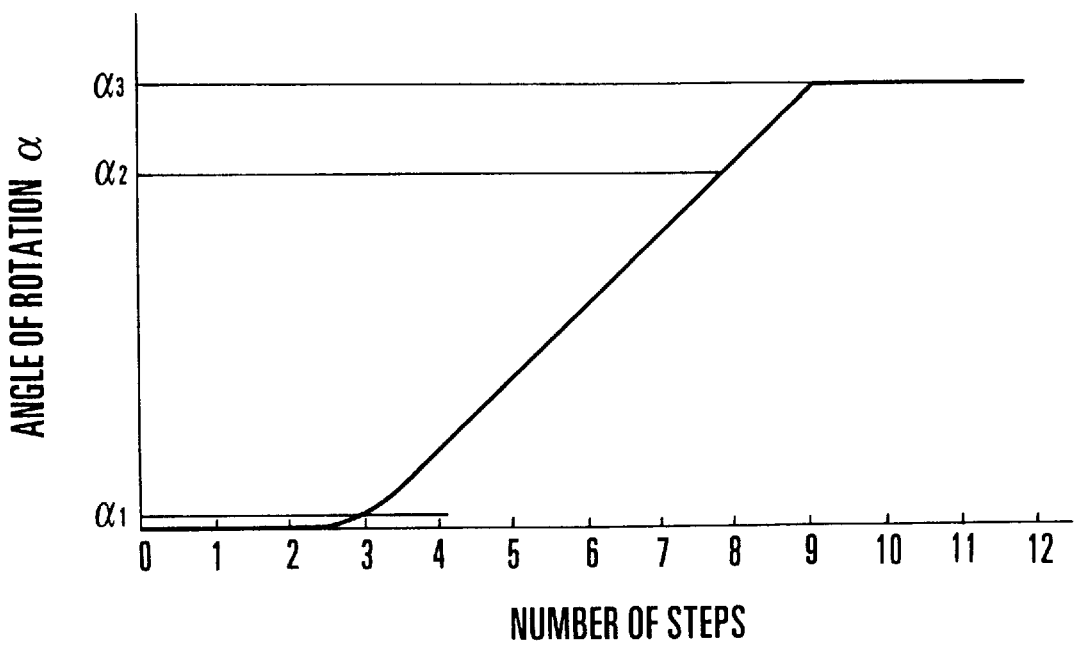
FIG. 11 is a graph showing the rotation angle of the blades of a second sector device of FIG. 1 in relation to the number of steps of the stepping motor.

FIG. 10 is a sectional view taken along a line B—B shown in FIG. 2. Referring to FIG. 10, when the second driving ring 12 is driven by the second stepping motor 15 in the direction of arrow D, the third and fourth shutter blades 18 and 19 rotate around the optical axis. At the same time, the cam grooves 11b and 11c cause the shutter blades 18 and 19 to rotate around their holes 18a and 19a. The relation of the angle of rotation α around the holes 18a and 19a of the first and second shutter blades 18 and 19 to the number of steps of the second stepping motor 15 is shown in FIG. 11. The rotation does not take place before the end of the second step, is caused to begin by the third step, and comes to a stop when the rotation angle reaches an angle α3 at the ninth step. Up to the twelfth step after the ninth step, the rotation angle ceases to increase any further. The shutter blades 18 and 19 then come to rotate only around the optical axis. In the drawing, a rotation angle α1 indicates an angle at which the third and fourth shutter blades 18 and 19 begin to enter the full-open aperture 10a. At a rotation angle α2, the third and fourth shutter blades 18 and 19 form a pinhole.

The arrangement of a sector device which consists of the third shutter blade 18, the fourth shutter blade 19, the second driving ring 12, the second stepping motor 15, etc., will hereinafter be called a second sector device.

In the second sector device, like in the first sector device, an error of the shutter blade opening speed with respect to a value set by an electrical driving signal becomes very small after the fourth step. Since the cam grooves are arranged to hold the shutter blades 18 and 19 in a closed state after the ninth step until the twelfth step, the aperture will never be opened again even if the shutter blades 18 and 19 bounce at the twelfth step.

Figure 12:
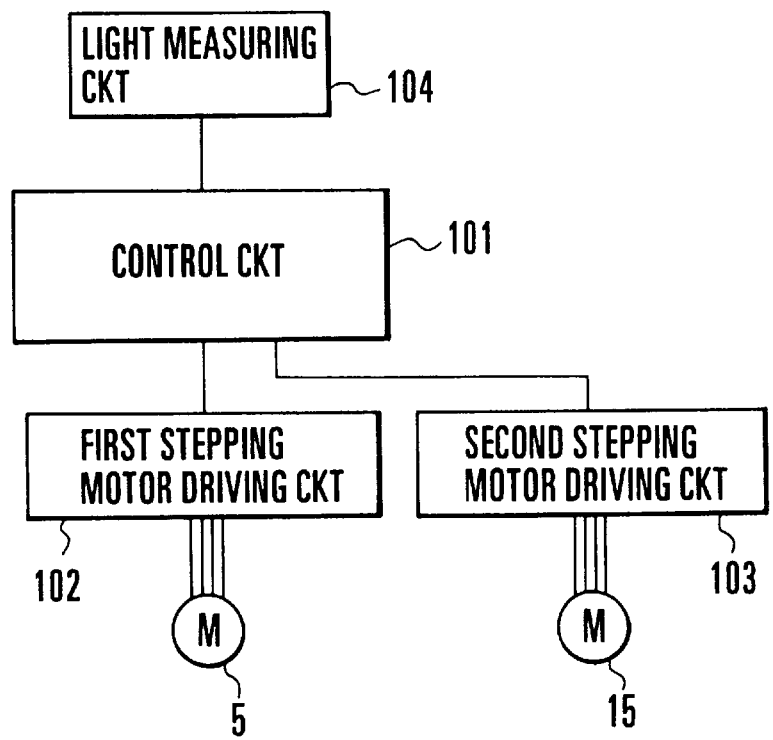
FIG. 12 is a block diagram showing an electric circuit of the first embodiment.

FIG. 12 is a block diagram showing an electric circuit arranged for this embodiment. Referring to FIG. 12, a control circuit 101 is composed of a microcomputer, etc., and is arranged to control the sequence of actions of the whole shutter device. A first stepping motor driving circuit 102 is arranged to drive the first stepping motor 5. A second stepping motor driving circuit 103 is arranged to drive the second stepping motor 15. A light measuring circuit 104 is arranged in a known manner to measure the luminance of the field of view.

Figure 13:
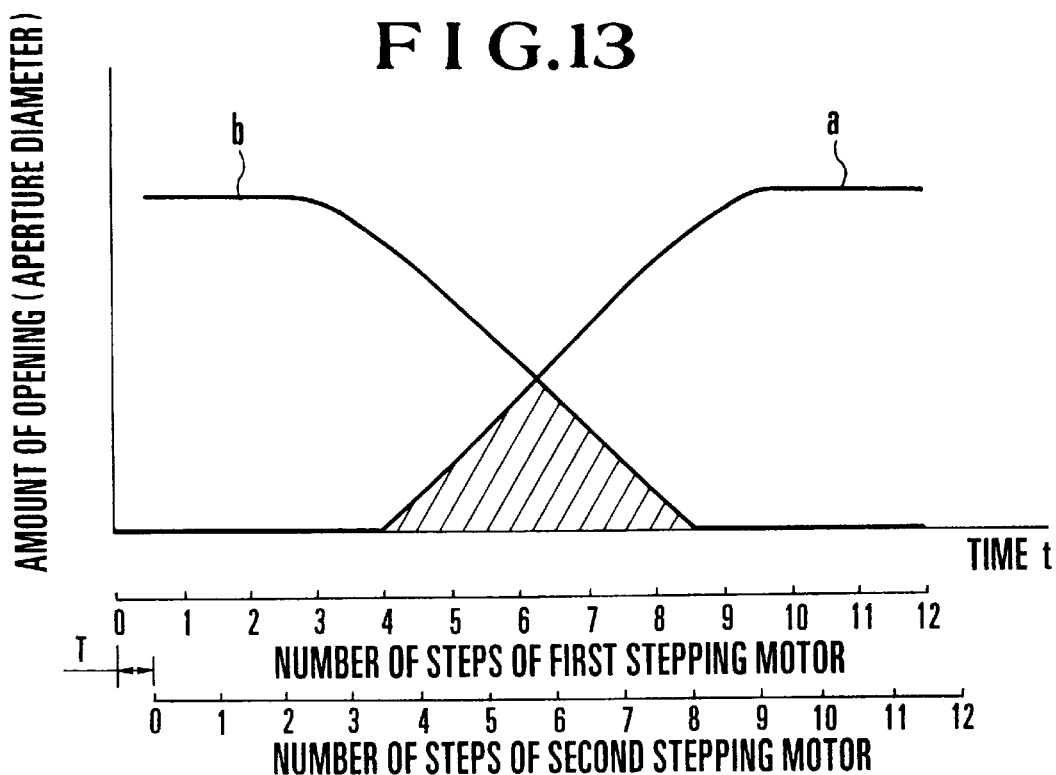
FIG. 13 is a graph showing the characteristic of the aperture in the first embodiment.

The control circuit 101 causes the first and second stepping motors 5 and 15, through the first and second stepping motor driving circuits 102 and 103, to drive the first and second driving rings 2 and 12 to rotate from their initial positions shown in FIGS. 3 and 10 in the directions of arrows C and D, respectively, while delaying the timing of start of driving the second stepping motor 15 as much as a period of time T (hereinafter referred to as the delay time T) on the basis of the luminance of field measured by the light measuring circuit 104, as shown in FIG. 13 which is a graph. In FIG. 13, the amount of opening (an aperture diameter) obtained by the first sector device is indicated by a curve "a" and the amount of opening obtained by the second sector device is indicated by another curve "b". The axis of abscissa shows a period of time elapsing from the start of driving of the first sector device together with the numbers of steps of the first and second stepping motors 5 and 15. An area in which the aperture of the whole shutter device is opened is indicated by a hatched portion. The amount of exposure can be varied by adjusting the delay time T.

After completion of an exposure action, the first sector device is brought into the closed state as shown in FIG. 3 by causing the first stepping motor 5 to rotate backward. After that, the second sector device is brought into the full-open state, which is the initial state of the second sector device, as shown in FIG. 10 by causing the second stepping motor 15 to rotate backward.

Figure 14:
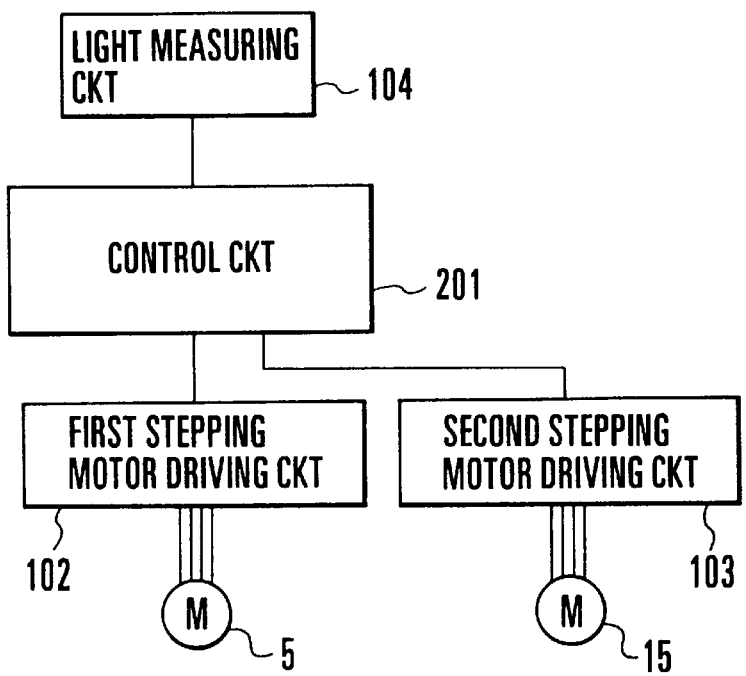
FIG. 14 is a block diagram showing an electric circuit of a second embodiment of this invention.

FIGS. 14 to 17 show a second embodiment of this invention. FIG. 14 is a block diagram showing an electric circuit of the second embodiment. Referring to FIG. 14, a control circuit 201 which is composed of a microcomputer, etc., is arranged to vary the exposure time alone according to the luminance of field while keeping a set amount of opening constant within a half open area of the shutter. In other words, the second embodiment is arranged to give a shutter of an aperture priority program type.

Figure 15:
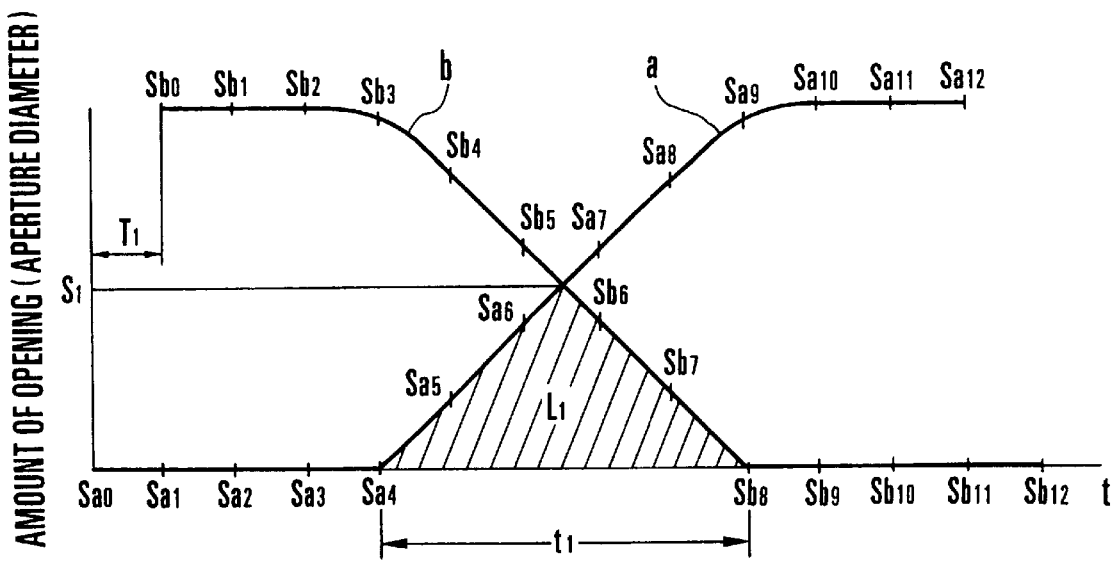
FIG. 15 is a graph showing the characteristic of the aperture in the second embodiment.
Figure 16:
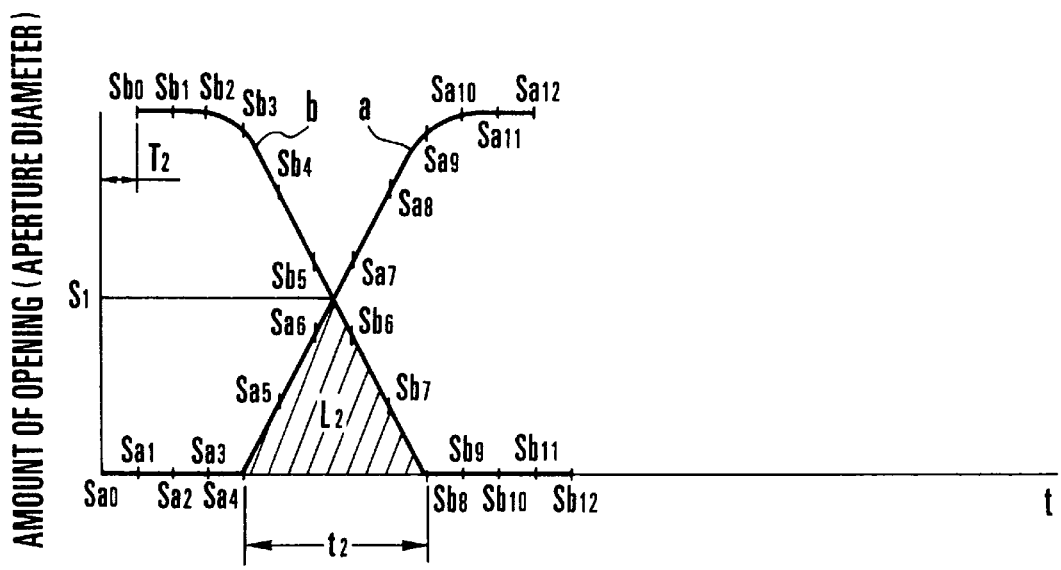
FIG. 16 is another graph showing the characteristic of the aperture in the second embodiment.
Figure 17:
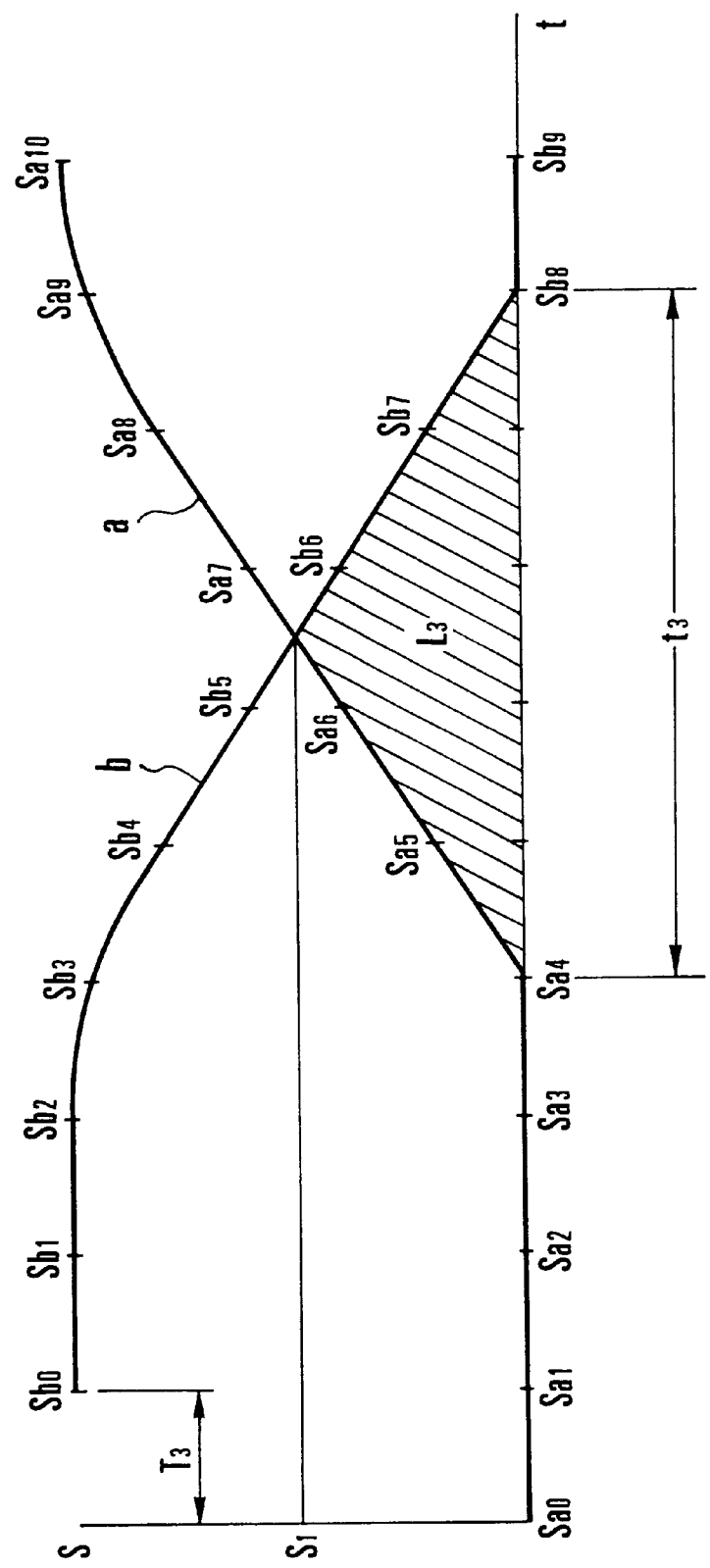
FIG. 17 is a further graph showing the characteristic of the aperture in the second embodiment.

The camera can be arranged to vary only the exposure time while keeping the amount of opening constant by varying the driving frequency of at least the first stepping motor of the first sector device and by varying the driving start time of the second sector device in such a way as to keep constant the amount of opening obtained when the curve of the amount of opening of the first sector device intersects that of the second sector device. FIGS. 15, 16 and 17 show some examples of such arrangement. In each of these figures, the axis of abscissa shows time elapsing from a start time point "0" of the driving action of the first sector device. The axis of ordinate shows the amounts of opening obtained by the first and second sector devices. Points sa0, sa1, - - - and sa12 on a curve "a" indicate the amounts of opening obtained in the first sector device in the respective steps of the first stepping motor. Points sb0, sb1, - - - and sb12 indicate the amounts of opening obtained in the second sector device in the respective steps of the second stepping motor.

In FIGS. 15 to 17, hatched areas L1, L2 and L3 represent the amounts of exposure obtained by the shutter device.

Assuming that the amount of exposure L1, the driving frequencies of the first and second stepping motors and the delay time T1 of driving the second stepping motor with respect to the first stepping motor shown in FIG. 15 are reference values, the values of the examples become as follows: in FIG. 15, the amount of opening is S1 and an effective exposure time is t1/2. In the case of FIG. 16, each of the driving frequencies of the first and second stepping motors is two times as high as the driving frequency shown in FIG. 16. The driving start delay time T2 of the second stepping motor with respect to the first stepping motor is ($\frac{1}{2}$)T1. As apparent from the drawing, the effective exposure time t2/2 is t1/4 while the amount of opening is S1. Therefore, the amount of exposure L2 in FIG. 16 can be expressed as. L2=($\frac{1}{2}$)L1.

In the case of the example shown in FIG. 17, each of the driving frequencies of the first and second stepping motors is $\frac{2}{3}$ of the driving frequency shown in FIG. 15. The driving start delay time T3 of the second stepping motor with respect to the first stepping motor is ($\frac{3}{2}$)T1. As apparent from the drawing, the effective exposure time t3/2 in FIG. 17 is ($\frac{3}{2}$)t1 while the amount of opening is S1. Therefore, the amount of exposure L3 can be expressed as. L3=($\frac{3}{2}$)L1

As described above, the exposure time can be varied alone, while the amount of opening is kept constant, by varying the stepping motor driving frequency and also the delay time of the start of driving the second stepping motor with respect to the first stepping motor.

Figure 18:
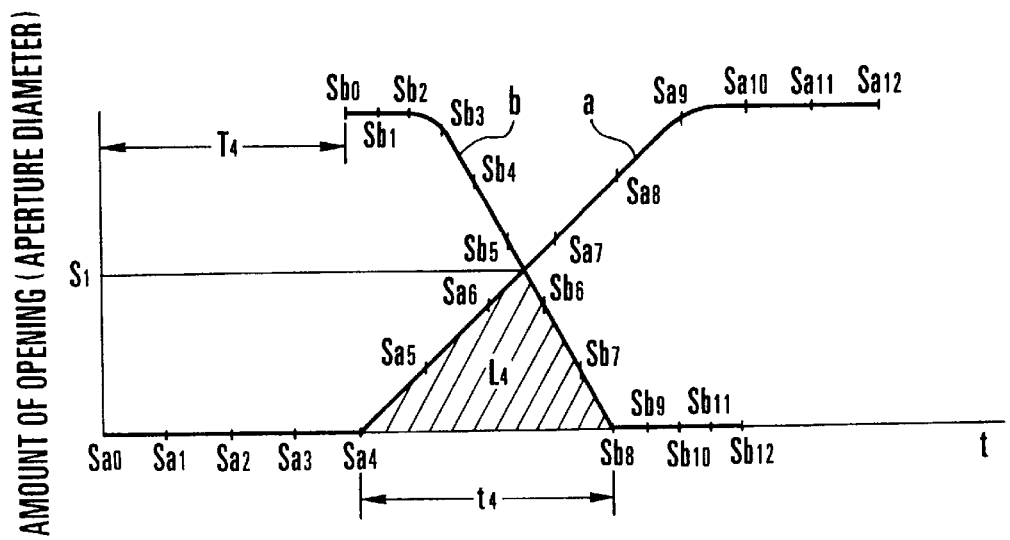
FIG. 18 is a graph showing the characteristic of the aperture obtained in a case where driving frequencies of first and second stepping motors differ from each other.

FIG. 18 shows a case wherein the first stepping motor driving frequency is the same as the frequency shown in FIG. 15, whereas the second stepping motor driving frequency is the same as the frequency shown in FIG. 16 which is twice as high as the frequency in FIG. 15. The delay time T4 is adjusted in such a way as to have the amount of opening S1. In this case, the effective exposure time t4/2 is ($\frac{3}{8}$)t1. The exposure amount L4 of this example can be expressed as. L4=($\frac{3}{4}$)L1

Figure 19:
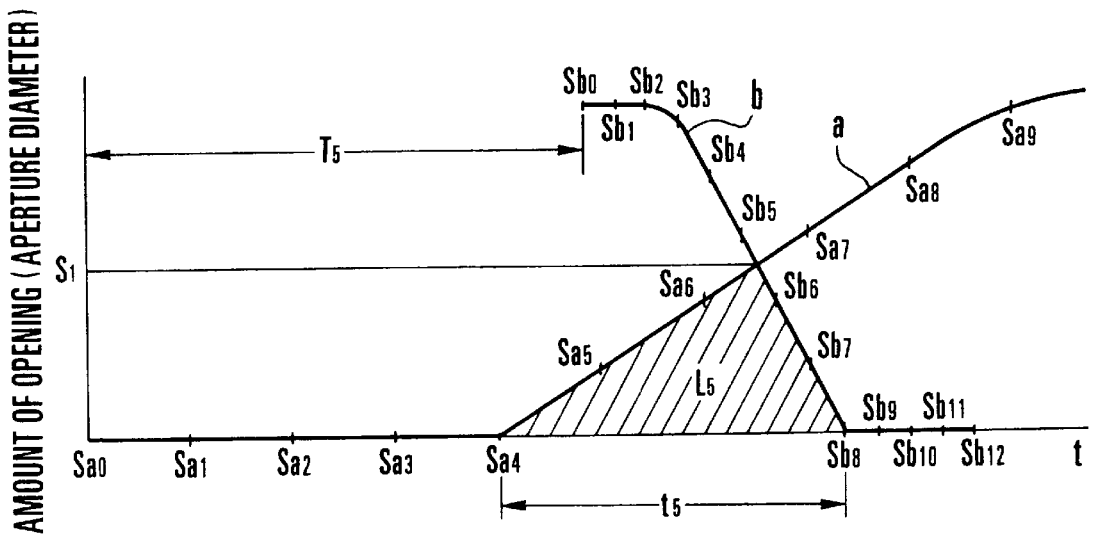
FIG. 19 is a graph showing the characteristic of the aperture obtained in a case where driving frequencies of the first and second stepping motors differ from each other.

FIG. 19 shows another case wherein the first stepping motor driving frequency is set at a frequency which is the same as the frequency shown in FIG. 17 and is $\frac{2}{3}$ of the frequency in FIG. 15. The second stepping motor driving frequency is set at a frequency which is the same as the frequency shown in FIG. 16 and is twice as high as the frequency of FIG. 15. The delay time T5 is adjusted in such a way as to have the amount of opening S1. The effective exposure time t5/2 is t1/2. The exposure amount L5 can be expressed as: L5=L1.

With the first stepping motor driving frequency and the second stepping motor driving frequency set at different values in the above stated manner, the shutter can be operated in a manner most apposite to the shooting condition even if the amount of opening and the amount of exposure remain unchanged.

In manufacturing the shutter device of the kind described above, the load of driving the first sector device and that of driving the second sector device do not always coincide with each other, and the driving output of the first sector device and that of the second sector device also not always coincide with each other. In order to prevent out-of-step driving, therefore, it has been necessary to adjust and set the stepping motor driving frequency at a value apposite to one of the sector devices having the slower driving output than the other. Further, the relation between the driving frequency and the driving load is important as it tends to affect the build-up characteristic of the stepping motor and eventually affects the accuracy of exposure control.

For example, in a case where the driving load is very small, the driving output of the stepping motor is high and the driving frequency is low, the driving might repeatedly become faster and slower than a desired speed from the start of driving and thus requires too much time before it converges to the desired speed. In order to quickly bring the driving speed to the desired speed, the driving frequency of the stepping motor must be optimized in relation to the driving load and the driving output.

Figure 20:
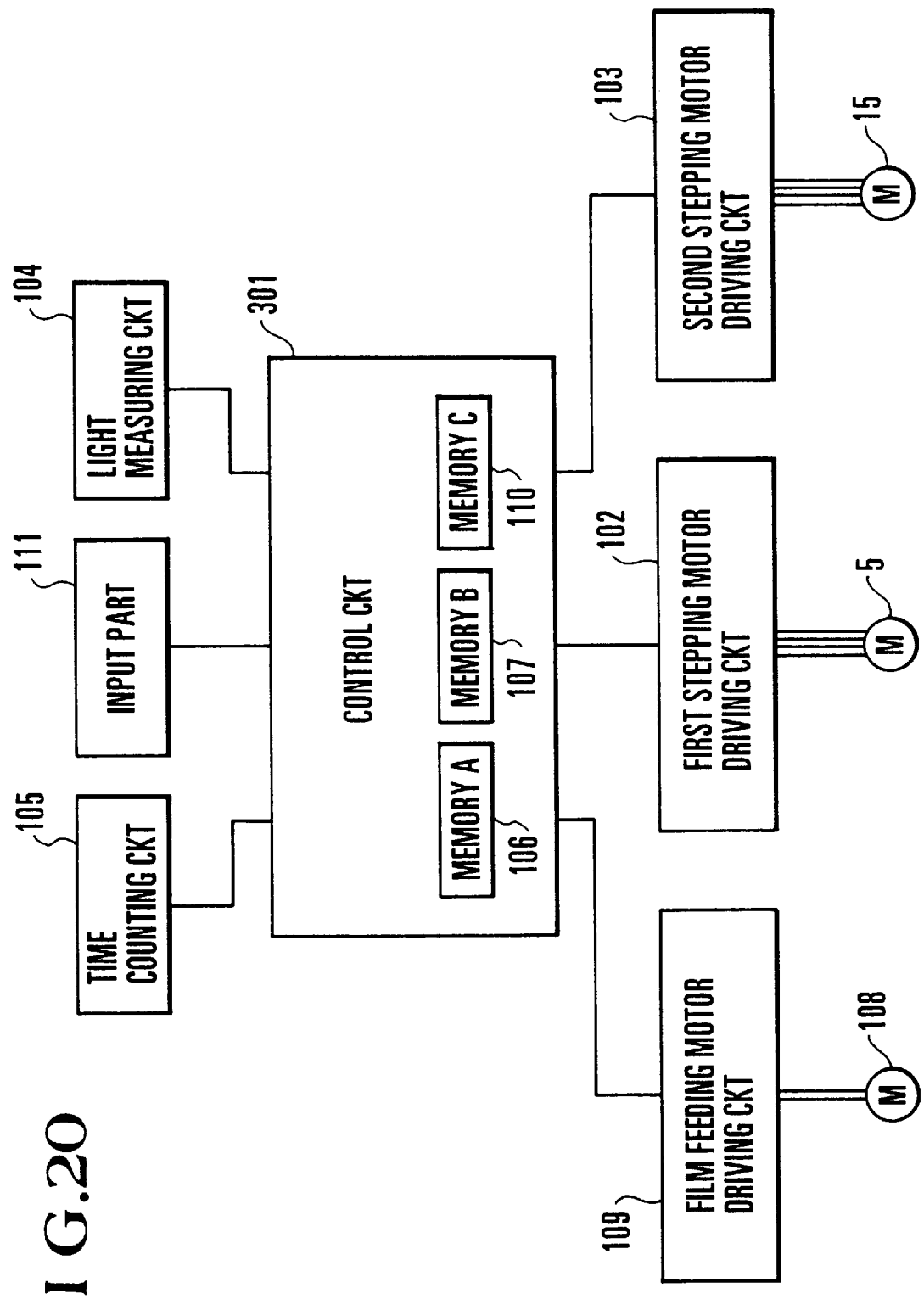
FIG. 20 is a block diagram showing an electric circuit of a third embodiment of this invention.
Figure 21:
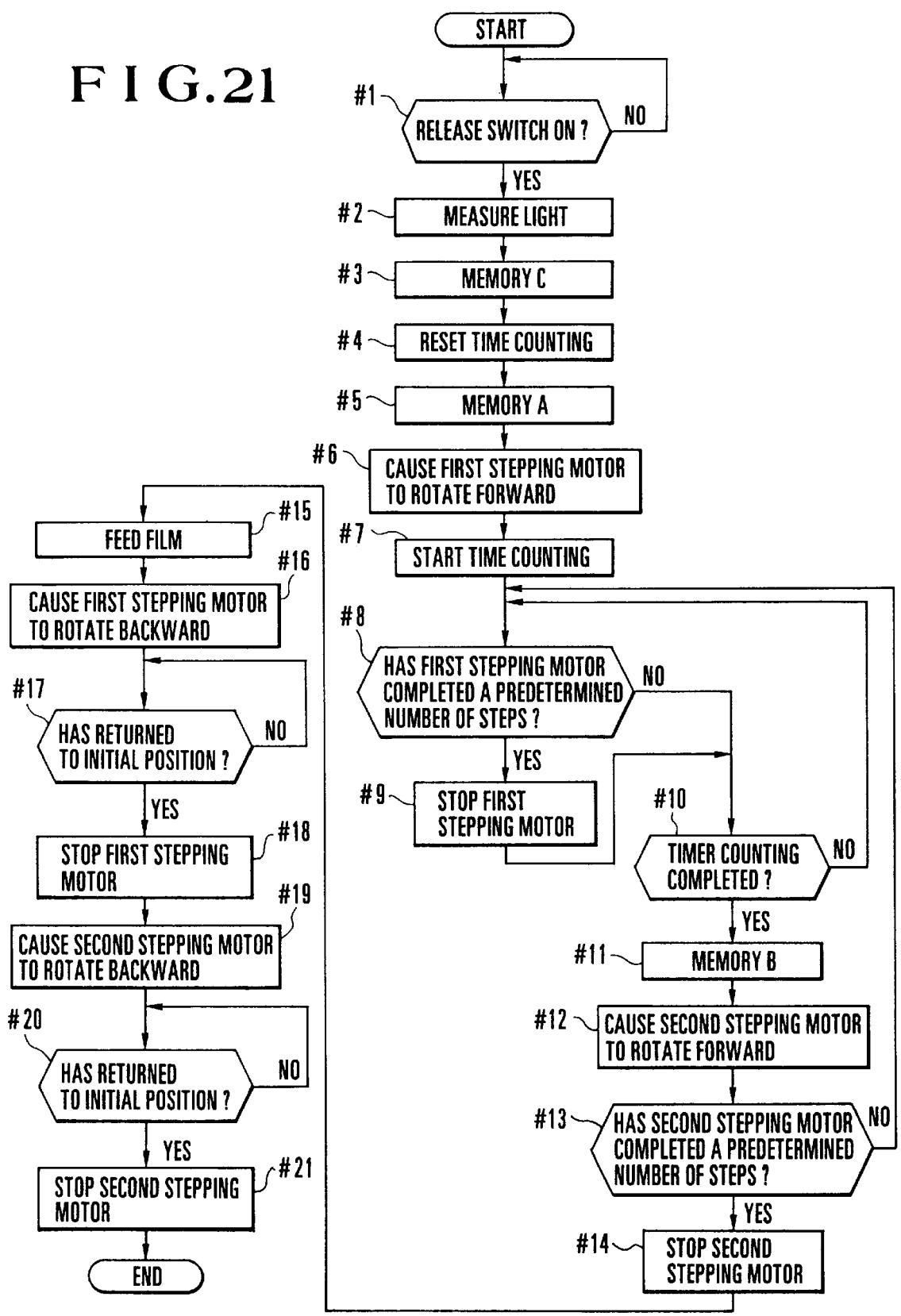
FIG. 21 is a flow chart showing the operation of the third embodiment.

For this purpose, the load of driving the sector device and the driving output of the stepping motor must be arranged to be as constant as possible. To attain this purpose, third and fourth embodiments of this invention are arranged as described in detail below:

FIGS. 20 and 21 show the third embodiment. The third embodiment is provided with first and second data storing means. The first data storing means is arranged to store optimum driving frequency data for the driving output of a first stepping motor 5 and the load of a first sector device. The first stepping motor 5 is driven on the basis of the driving frequency data thus stored. The second data storing means is arranged to store optimum driving frequency data for the driving output of a second stepping motor 15 and the load of a second sector device. The second stepping motor 15 is driven on the basis of the data stored in the second data storing means.

FIG. 20 is a block diagram showing an electric circuit to be used by the third embodiment. Referring to FIG. 20, a control circuit 301 which is composed of a microcomputer, etc., is arranged to control the sequence of actions of the whole shutter device. A first stepping motor driving circuit 102 is arranged to drive the first stepping motor 5. A second stepping motor driving circuit 103 is arranged to drive the second stepping motor 15. A light measuring circuit 104 is arranged in a known manner to measure the luminance of field. The control circuit 301 is provided with a time counting circuit 105 and data storing means 106 and 107. The data storing means 106 and 107 are composed of nonvolatile memories A and B which are EEPROMs or the like. The memory A is the data storing means for storing driving frequency data for the first stepping motor 5. The memory B is the data storing means for storing driving frequency data for the second stepping motor 15. The driving frequency data stored in the memory A for the first stepping motor 5 is stored, when the shutter device is assembled, as data most suited for stable and high speed driving according to the driving output of the first stepping motor 5 and a load existing in driving the first sector device.

The driving frequency data stored in the memory B for the second stepping motor 15 is stored, also when the shutter device is assembled, as data most suited for stable and high speed driving according to the the driving output of the second stepping motor 15 and a load existing in driving the second sector device.

A film feeding motor 108 is arranged to drive a film feeding gear train in a known manner. A film feeding motor driving circuit 109 is arranged to drive the film feeding motor 108. A memory C 110 which is composed of a nonvolatile memory such as an EEPROM or the like is provided as another data storing means. The memory C 110 stores the data of the delay time corresponding to the luminance of field which varies according to the load characteristic of the first sector device, the load characteristic of the second sector device, the driving characteristic of the first stepping motor and the driving characteristic of the second stepping motor. The data is stored in the memory C 110 when the shutter device is assembled. In other words, a table of delay times which correspond to the luminance of field is stored for each individual shutter device. An input part 111 is arranged to receive, for example, information on a shutter speed, an aperture value and so on.

The control circuit 301 causes the first stepping motor driving circuit 102 and the second stepping motor driving circuit 103 to drive respectively the first stepping motor 5 and the second stepping motor 15 by shifting the driving start time as much as the period of time T set on the basis of the luminance of field measured by the light measuring circuit 104. In response to this, the first driving ring 2 and the second driving ring 12 are respectively caused to rotate from their initial positions shown in FIGS. 3 and 10 in the directions of arrows C and D. The details of this operation of the control circuit 301 will be described later with reference to FIG. 21 which is a flow chart.

In FIG. 13 which shows the amount of opening of the aperture obtained by the exposure action of the shutter, a curve "a" represents the amounts of opening obtained by the first sector device of the shutter. A curve "b" represents the amounts of opening obtained by the second sector device. The axis of abscissa shows the time elapsing from the start of driving of the first sector device and the number of steps taken respectively by the first and second stepping motors 5 and 15. A part indicated by hatching represents the area of exposure actually obtained. The amount of exposure can be varied by adjusting the length of the delay time T.

Upon completion of the exposure action, the first stepping motor is first caused to rotate backward to bring the first sector device into a closed state as shown in FIG. 3. After that, the second stepping motor is caused to rotate backward to bring the second sector device into a full open state as shown in FIG. 10. The first and second sector devices are thus brought back to their initial states after completion of an exposure.

The flow of operation of the control circuit 301 is described with reference to the flow chart of FIG. 21 as follows. at a step 1, a check is made to find if a release switch which is not shown has been turned on. If so, the flow proceeds to a step 2. At the step 2, the light measuring circuit 104 is activated to measure the luminance of an object of shooting. At a step 3, the data stored in the memory C is read out and the delay time T corresponding to the luminance measured in the step 2 is decided. The count-up time of a timer which will be described later is used for the delay time T. At a step 4, the time counting circuit 105 is reset. At a step 5, the data stored in the memory A is read out. The data read out has been set and stored when the shutter device is assembled, on the basis of a relation between the driving output of the first stepping motor 5 and the driving load of the first sector device, as data representing a driving frequency at which driving can be accomplished most stably and at a high speed.

At a step 6, the first stepping motor 5 is caused through the first stepping motor driving circuit 102 to begin driving to bring the first sector device from the state of FIG. 3 toward the state of FIG. 7 according to the driving frequency data read out in the step 5. At a step 7, the time counting circuit 105 is caused to begin to count the time elapsing from the start of driving the first stepping motor 5.

At a step 8, a check is made to find if the first stepping motor 5 has been driven through the first stepping motor driving circuit 102 a predetermined number of steps, i.e., 12 steps in the case of this embodiment as shown in FIG. 8. If so, the flow comes to a step 9. If not, the flow comes to a step 10 while it is continued to drive the first stepping motor 5 for the predetermined number of steps. At the step 9, the first stepping motor 5 is brought to a stop. At the step 10, the time counting circuit 105 is checked to find if the count started in the step 7 has reached a length of time decided in the step 3. If not, the flow comes back to the step 8. If so, the flow proceeds to a step 11.

At the step 11, data stored in the memory B is read out. The data read out has been set and stored at the time of assembly, according to a relation between the driving output of the second stepping motor 15 and the driving load of the second sector device, to be data representing a driving frequency at which driving can be accomplished most stably and at a high speed. At a step 12, the second stepping motor 15 is driven through the second stepping motor driving circuit 103 to begin to drive the second sector device from its full open state shown in FIG. 10 toward a fully closed state according to the driving frequency data read out in the step 11.

At a step 13, a check is made to find if the second stepping motor 15 has been driven, through the second stepping motor driving circuit 103, a predetermined number of steps, i.e., 12 as shown in FIG. 11 in the case of this embodiment. If so, the flow proceeds to a step 14. If not, the flow comes back to the step 8 while continuing the process of driving the second stepping motor 15 for the predetermined number of steps.

At the step 14, the second stepping motor 15 is brought to a stop through the second stepping motor driving circuit 103. At a step 15, the film feeding motor 108 is driven through the film feeding motor driving circuit 109. A film in use is thus wound for a next frame of film. At a step 16, the first stepping motor 5 is driven through the first stepping motor driving circuit 102 to rotate backward at a predetermined driving frequency in such a way as to bring the first sector device into the first state shown in FIG. 3. The driving frequency to be used in this instance does not have to be the driving frequency stored in the memory A.

At a step 17, a check is made to find if the first sector device has been brought back to the state shown in FIG. 3 with the first stepping motor having been driven the predetermined number of steps through the first stepping motor driving circuit 102. If so, the flow comes to a step 18. At the step 18, the first stepping motor 5 is brought to a stop through the first stepping motor driving circuit 102. At a step 19, the second stepping motor 15 is driven to rotate backward through the second stepping motor driving circuit 103 at a predetermined driving frequency in such a way as to bring the second sector device into its state shown in FIG. 10. The driving frequency to be used in that instance does not have to be the driving frequency stored in the memory B.

At a step 20, a check is made to find if the second sector device has been brought back to the state shown in FIG. 10 with the second stepping motor having been driven the predetermined number of steps through the second stepping motor driving circuit 103. If so, the flow proceeds to a step 21 to bring the second stepping motor 15 to a stop through the second stepping motor driving circuit 103.

Figure 22:
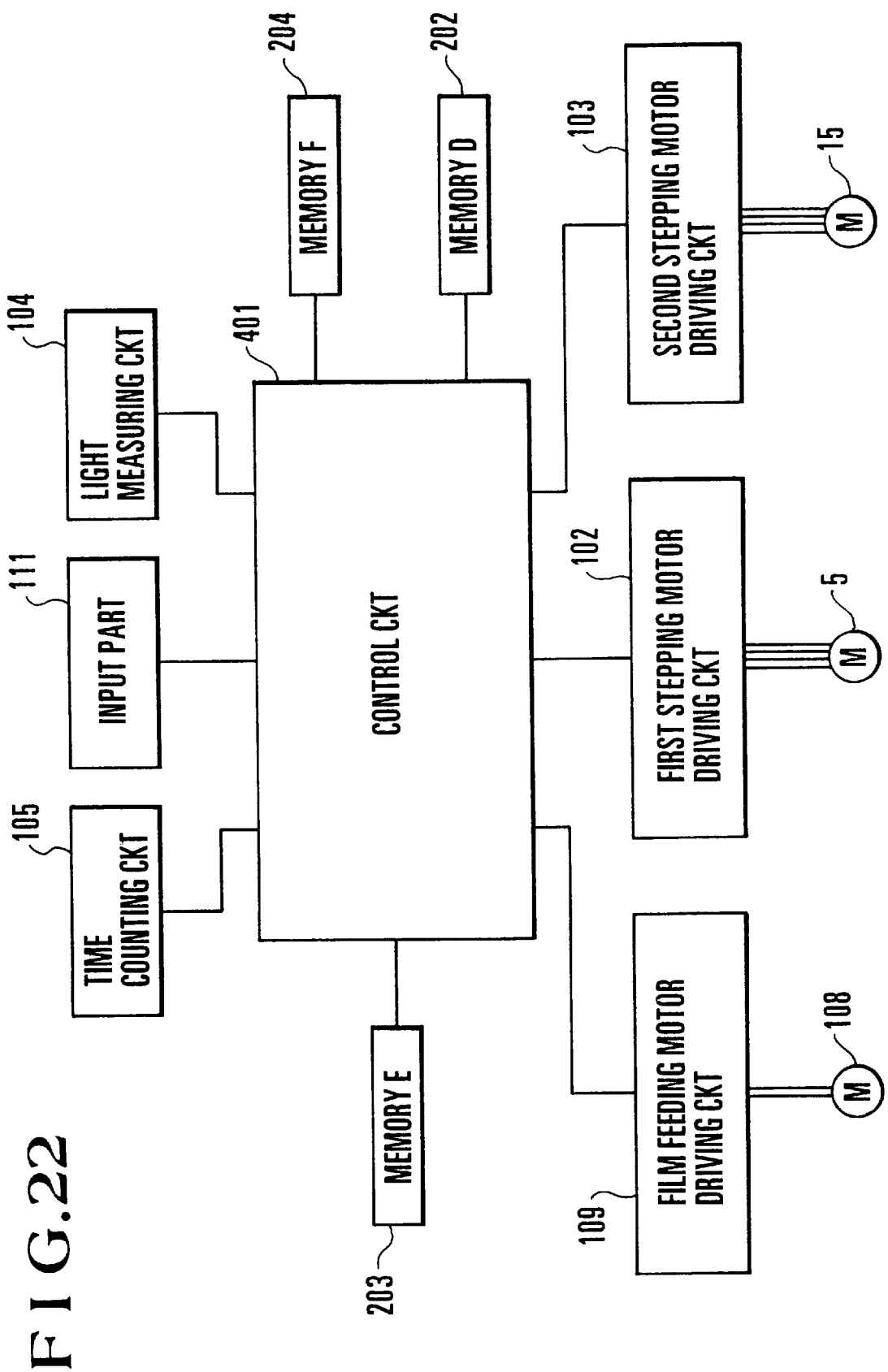
FIG. 22 is a block diagram showing an electric circuit of a fourth embodiment of this invention.

FIGS. 22 to 26 show a fourth embodiment of this invention. FIG. 22 is a block diagram showing an electric circuit of a shutter device arranged as the fourth embodiment. In FIG. 22, all reference numerals that are the same as those used in the foregoing description of other embodiments denote the same parts. Reference numeral 401 denotes a control circuit 401 which is composed of a microcomputer, etc. The control circuit 401 is arranged to give an aperture-value-priority programmed type shutter wherein a certain amount of opening S1 in a half-open area of the shutter is arranged to be constant while the exposure time of the shutter is arranged to be variable. The details of this arrangement are as follow:

The driving frequency to be applied to at least one of the first and second stepping motors 5 and 15 is arranged to be variable while the driving start time of the second sector device is arranged to be variable in such a way as to make constant the amount of opening which is obtained when the curve of the amount of opening of the sector device intersects that of the second sector device. This arrangement enables the shutter device to change only the exposure time while keeping the amount of opening constant.

Figure 25:
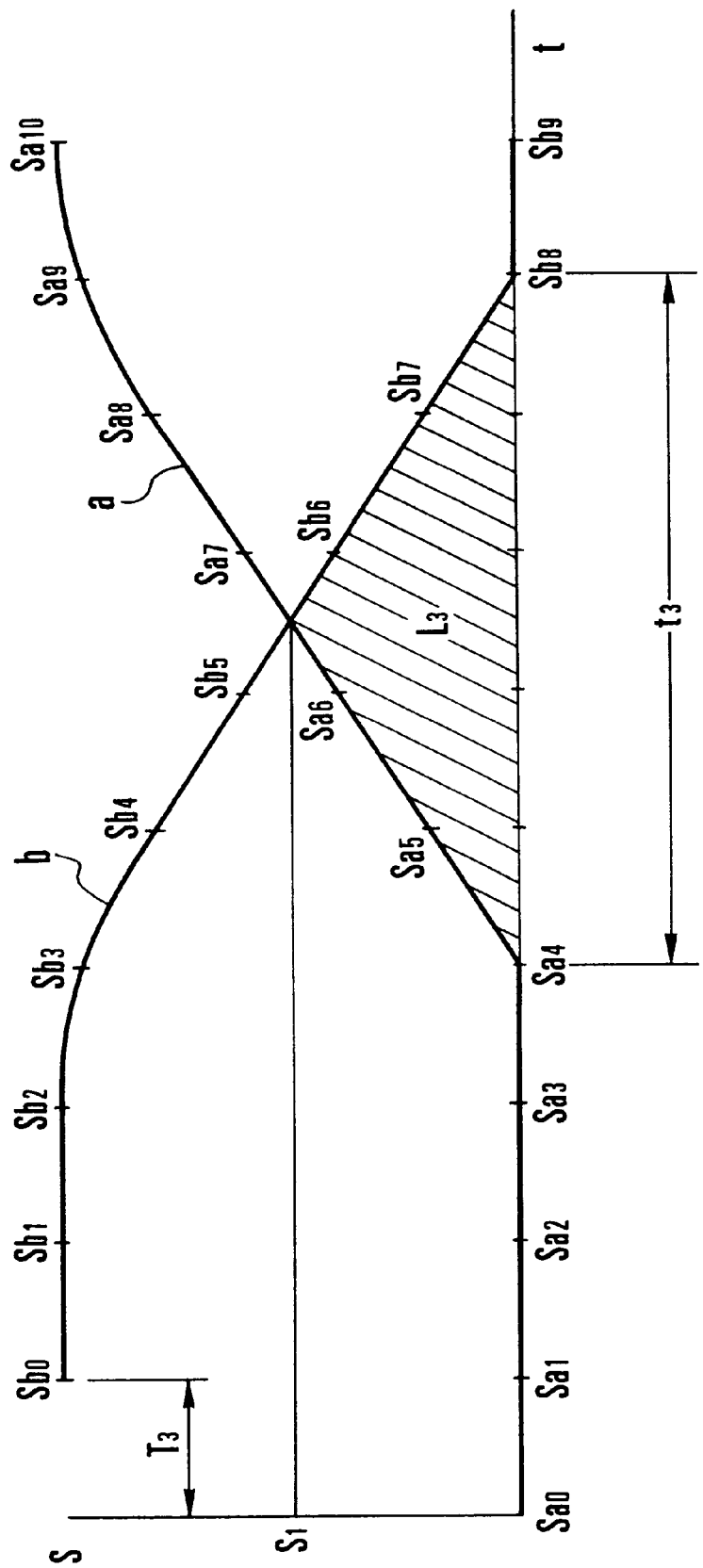
FIG. 25 is another graph showing the characteristic of the aperture in the fourth embodiment.

FIGS. 23, 24 and 25 show in graphs some examples of the arrangement mentioned above. In each of these graphs, the axis of abscissa shows time elapsing from a point of time "0" at which the first sector device begins to be driven. The axis of ordinate shows the amounts of opening obtained by the first and second sector devices. Points Sa0, Sa1, - - - , Sa12 on a curve "a" show the amounts of opening obtained in the respective steps of the first stepping motor 5 of the first sector device. Points Sb0, Sb1, Sb2, - - - , Sb12 on another curve "b" show the amounts of opening obtained in the respective steps of the second stepping motor 15 of the second sector device. In FIGS. 23, 24 and 25, hatched parts L1, L2 and L3 show the amounts of exposure.

With the amount of exposure L1, the driving frequencies of the first and second stepping motors 5 and 15, a delay time T1 of the second stepping motor 15 from the start of driving of the first stepping motor 5 in the example shown in FIG. 23 assumed to be reference values, these examples are compared as follows: the effective exposure time is t1/2 while the amount of opening is S1 in the example shown in FIG. 23. In the case of FIG. 24, each of the driving frequencies of the first and second stepping motors 5 and 15 is twice as high as that of FIG. 23 and the driving start delay time T2 of the second stepping motor 15 from the first stepping motor 5 is (½)T1. Therefore, as apparent from the drawings, the effective exposure time t2/2 of FIG. 24 is t1/4 while the amount of opening is S1. The amount of exposure L2 is, therefore, (½)L1. In the case of the example shown in FIG. 25, each of the driving frequencies of the first and second stepping motors 5 and 15 is ⅔ of the driving frequency in FIG. 23. The driving start delay time T3 of the second stepping motor 15 from the start of driving the first stepping motor 5 is (3/2)T1. Therefore, as apparent from the drawings, the effective exposure time t3/2 in FIG. 25 is (3/2)t1 while the amount of opening is S1. Therefore, the amount of exposure L3 is (3/2)L1.

With the driving frequency of the first and second stepping motors and the driving start delay time of the second stepping motor (with reference to the first stepping motor) varied as described above, the exposure time alone is variable while keeping the amount of opening constant. It is of course possible to carry out exposure control to vary only the exposure time, without varying the amount of opening, by not varying the driving frequency of one of the two stepping motors and by varying the driving frequency of the other stepping motor and also the above-stated driving start delay time.

Referring to FIG. 22, the fourth embodiment is provided with a memory D 202, a memory E 203 and a memory F 204 which are data storing means and are composed of nonvolatile memories such as EEPROMs. The memory D 202 is data storing means for storing the driving frequency data of the first stepping motor 5. The memory E 203 is data storing means for storing the driving frequency data of the second stepping motor 15. The first stepping motor driving frequency data stored in the memory D (202) is set when the shutter device is assembled according to the driving output of the first stepping motor and a load existing in driving the first sector device, as data for most stable driving at various aperture opening speeds. In other words, the memory D stores tables of data which include, for example, the following. driving-frequency data for most stable driving in the respective steps at the opening speed as shown in FIG. 23, driving frequency data for most stable driving in the respective steps at the opening speed as shown in FIG. 24 or driving frequency data for most stable driving in the respective steps at the opening speed as shown in FIG. 25. The memory D is thus arranged to store the driving frequency data for stably driving the first sector device at various aperture opening speeds, in the form of a number of tables corresponding to a desired number of opening speeds.

The data of the second stepping motor driving frequency stored in the memory E is set when the shutter device is assembled, according to the driving output of the second stepping motor and a load existing in driving the second sector device, as data for most stable driving at various aperture opening speeds or, to be exact, at various shutter closing speeds in this instance. In other words, the memory E stores tables of data which include. driving frequency data for most stable driving in the respective steps at various opening speeds such as the speeds shown in FIGS. 23, 24 and 25. The memory E is thus arranged to store the driving frequency data for stably driving the second sector device at various opening speeds, in a number of tables corresponding to the number of opening speeds.

Another memory F 204 is also data storing means which is composed of a nonvolatile memory such as an EEPROM. The memory F 204 is arranged to store, when the shutter device is assembled, the data of the above-stated driving start delay time which corresponds to the luminance of field and varies with the load characteristic of the first sector device, that of the second sector device and the driving characteristics of the first and second stepping motors. In addition to these data, the data of combinations of the driving frequencies of the first and second stepping motors are also stored in the form of a number of tables which correspond to the number of the combinations of these driving frequencies. Each individual product of the shutter device is thus arranged, at the time of assembly, to store the tables of data for the driving frequencies of the first and second stepping motors and the delay time suited for each of various values of the luminance of field. The input part 111 is arranged to enable the control circuit 401 to obtain information on a shutter speed or an aperture value.

Figure 26:
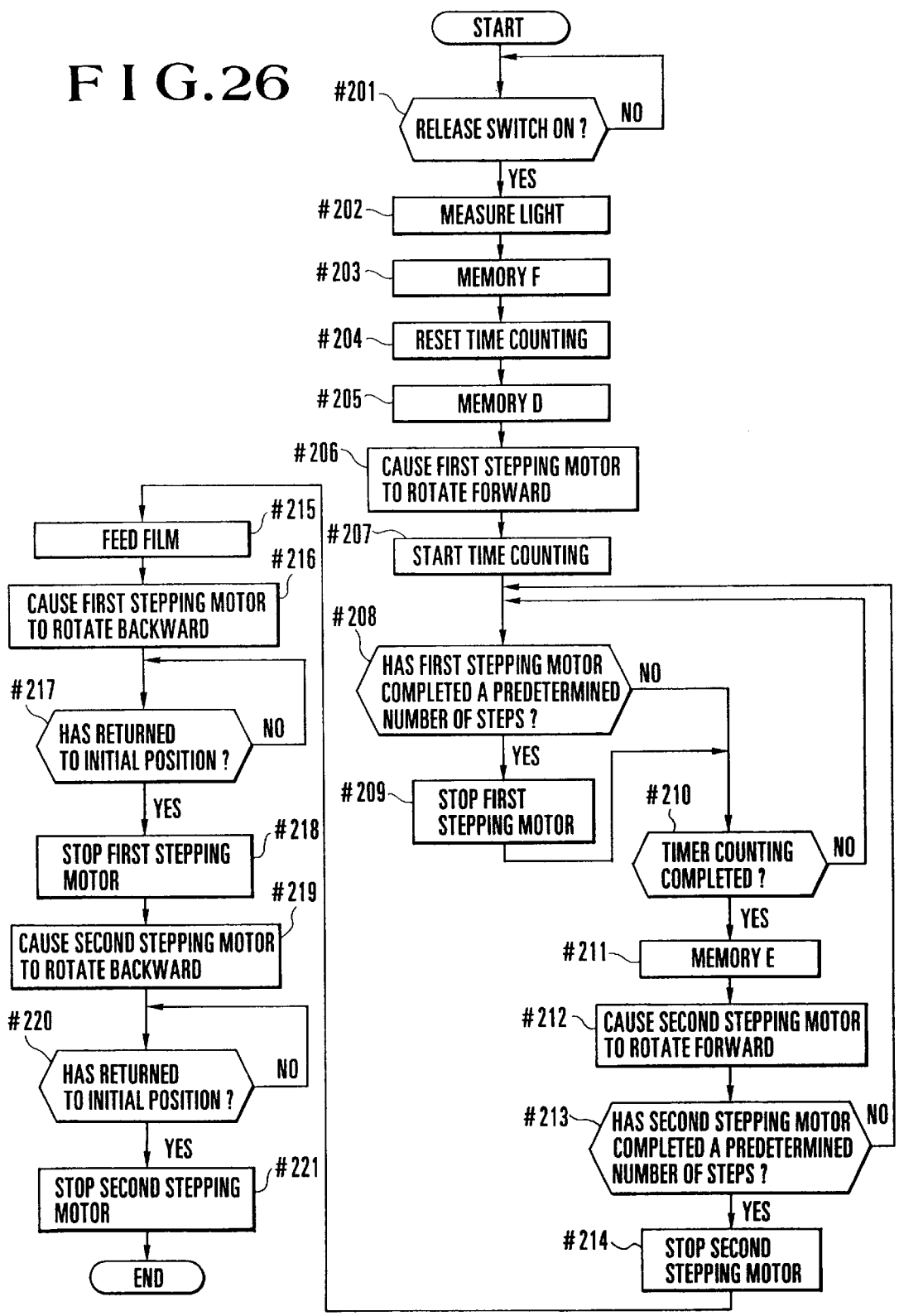
FIG. 26 is a flow chart showing the operation of the fourth embodiment.

FIG. 26 is a flow chart showing the operation of the control circuit 401. The operation is described with reference to the flow chart of FIG. 26 as follows:

At a step 201, a check is made to find if a release button which is not shown has been pushed to turn on a release switch which is also not shown. If so, the flow proceeds to a step 202. At the step 202, the luminance of an object of shooting is measured by activating the light measuring circuit 104. At a step 203, the data stored in the memory F is read out to decide a delay time value which corresponds to the luminance measured in the step 202. The delay time value decided is used later on as a count-up time of the timer at a step 210. The delay time is decided in relation to the driving frequency data of the first stepping motor read out from the memory D at a step 205 and the driving frequency data of the second stepping motor read out from the memory E at a step 211 and is decided in such a way as to keep the amount of opening constant even when the luminance of the object comes to vary, as described in the foregoing with reference to FIGS. 23, 24 and 25. At a step 204, the time counting circuit 105 is reset.

At the step 205, such driving frequency data that will give an opening speed suited for the object luminance measured in the step 202 is read out from the memory D, from among the tables of data which have been judged, on the basis of a relation between the driving output of the first stepping motor and the driving load of the first sector device, and stored in the memory D at the time of assembly as data of driving frequencies at which driving can be most stably carried out.

At a step 206, the first stepping motor 5 is driven through the first stepping motor driving circuit 102 to shift the state of the first sector device from its state shown in FIG. 3 toward its state shown in FIG. 7 according to the driving frequency data read out in the step 205. At a step 207, the time counting circuit 105 is caused to begin counting time elapsing from the start of driving the first stepping motor 5. At a step 208, the first stepping motor driving circuit 102 is checked to find if the first stepping motor 5 has been driven a predetermined number of steps, i.e., 12 steps in the case of this embodiment, as shown in FIG. 8. If so, the flow proceeds to a step 209. If not, the flow comes to a step 210 while allowing the first stepping motor 5 to be driven the rest of the predetermined number of steps.

At the step 209, the first stepping motor 5 is brought to a stop through the first stepping motor driving circuit 102. At the step 210, a check is made to find if the count of the time counting circuit 105 started in the step 207 has reached the time decided in the step 203. If not, the flow comes back to the step 208. If so, the flow proceeds to a step 211.

At the step 211, such driving frequency data that will give an opening speed suited for the object luminance measured in the step 202 is read out from the memory E, from among the tables of data which have been judged, on the basis of a relation between the driving output of the second stepping motor and the driving load of the second sector device and stored in the memory E at the time of assembly to be data of driving frequencies at which driving can be most stably carried out.

At a step 212, the second stepping motor 15 is driven through the second stepping motor driving circuit 103 to shift the state of the second sector device from its full-open state shown in FIG. 10 toward a fully closed state according to the driving frequency data read out in the step 211. At a step 213, the second stepping motor driving circuit 103 is checked to find if the second stepping motor 15 has been driven a predetermined number of steps, i.e., 12 steps in the case of this embodiment as shown in FIG. 11. If so, the flow proceeds to a step 214. If not, the flow comes back to the step 208 while allowing the second stepping motor 15 to be further driven the rest of the predetermined number of steps.

At the step 214, the second stepping motor 15 is brought to a stop through the second stepping motor driving circuit 103. At a step 215, the film feeding motor driving circuit 109 is caused to drive the film feeding motor 108 to wind the film for a next frame.

At a step 216, the first stepping motor driving circuit 102 is caused to drive the first stepping motor 5 to shift the state of the first sector device toward the first state shown in FIG. 3 at a predetermined driving frequency, which does not have to be in accordance with the data stored in the memory D.

At a step 217, the first stepping motor driving circuit 102 is checked to find if the first sector device has been driven into the state shown in FIG. 3 by the first stepping motor 5. If so, the flow proceeds to a step 218 to bring the first stepping motor 5 to a stop through the first stepping motor driving circuit 102.

At a step 219, the second stepping motor driving circuit 103 is caused to drive the second stepping motor 15 in such a way as to shift the state of the second sector device toward its state shown in FIG. 10 at a predetermined driving frequency, which does not have to be in accordance with the data stored in the memory E.

At a step 220, the second stepping motor driving circuit 103 is checked to find if the second sector device has been brought back to its state shown in FIG. 10 by the second stepping motor 15. If so, the flow proceeds to a step 221 to bring the second stepping motor 15 to a stop through the second stepping motor driving circuit 103.

With the embodiment arranged in this manner, each of the first and second sector devices respectively can be driven at a driving frequency which is decided to permit most stable driving from the relation between the driving output and the load of the first stepping motor and the first sector device and the relation between the driving output and the load of the second stepping motor and the second sector device. Therefore, the precision of the shutter device can be enhanced by the arrangement.

What is claimed is:

1. A shutter device, comprising:
   (a) a first light blocking member which starts from a closing state at the beginning of an exposure operation and moves from the closing state to an opening state during the exposure operation;
   (b) a first motor which drives said first light blocking member;
   (c) a second light blocking member which starts from an opening state at the beginning of an exposure operation and moves from the opening state to a closing state during the exposure operation;
   (d) a second motor which drives said second light blocking member;
   (e) a first cam member which forms a cam for guiding the movement of said first light blocking member, wherein said cam configures a first area in which said first light blocking member moves without changing an aperture amount and a second area in which said first light blocking member moves while changing the aperture amount; and
   (f) a second cam member which forms a cam for guiding the movement of said second light blocking member, wherein said cam configures a first area in which said second light blocking member moves without changing an aperture amount, and a second area in which said second light blocking member moves while changing the aperture amount.

2. A shutter device according to claim 1, wherein said first light blocking member traces the first area and then the second area formed on the first cam member and said second light blocking member traces the first area and then the second area formed on said second cam member at the time of the exposure operation.

3. A shutter device according to claim 1, wherein said first and second motors are a stepping motor driven by step pulses.

4. A shutter device according to claim 3, further comprising a control circuit which counts time from when the first motor starts driving and controls on the result of the time counting timing of starting the second motor to drive.

5. A shutter device according to claim 4, wherein said control circuit controls driving speeds of said first and second motors by changing frequency of the pulses.

6. A device according to claim 5, wherein said control circuit memorizes information about the driving speeds of said first and second motors.

7. A camera having a shutter device, comprising:
   (a) a first light blocking member which starts from a closing state at the beginning of an exposure operation and moves from the closing state to an opening state during the exposure operation;
   (b) a first motor which drives said first light blocking member;
   (c) a second light blocking member which starts from an opening state at the beginning of an exposure operation and moves from the opening state to a closing state during the exposure operation;
   (d) a second motor which drives said second light blocking member;
   (e) a first cam member which forms a cam for guiding the movement of said first light blocking member, wherein said cam configures a first area in which said first light blocking member moves without changing an aperture amount and a second area in which said first light blocking member moves while changing the aperture amount; and
   (f) a second cam member which forms a cam for guiding the movement of said second light blocking member, wherein said cam configures a first area in which said second light blocking member moves without changing an aperture amount, and a second area in which said second light blocking member moves while changing the aperture amount.

8. A camera according to claim 7, wherein said first light blocking member traces the first area and then the second area formed on the first cam member and said second light blocking member traces the first area and then the second area formed on said second cam member at the time of the exposure operation.

9. A camera according to claim 7, wherein said first and second motors are a stepping motor driven by step pulses.

10. A camera according to claim 9, further comprising a control circuit which counts time from when the first motor starts driving and controls on the result of the time counting timing of starting the second motor to drive.

11. A camera according to claim 10, wherein said control circuit controls driving speeds of said first and second motors by changing the frequency of the pulses.

12. A camera according to claim 11, wherein said control circuit memorizes information about the driving speeds of said first and second motors.

* * * * *

UNITED STATES PATENT AND TRADEMARK OFFICE
CERTIFICATE OF CORRECTION

PATENT NO. : 5,953,550
DATED : September 14, 1999
INVENTOR(S) : Chikara Aoshima

It is certified that error appears in the above-identified patent and that said Letters Patent are hereby corrected as shown below:

Col. 7, line 33, after "L1" insert -- . --.
Col. 7, line 33, delete "as." and insert -- as: --.
Col. 7, line 47, after "L1" insert -- . --.
Col. 7, line 47, delete "as." and insert -- as: --.
Col. 9, line 49, delete "follows." and insert -- following: --.
Col. 12, line 20, delete "lowing." and insert -- follows: --.
Col. 12, line 37, delete "include." and insert -- include: --.

Signed and Sealed this

Tenth Day of April, 2001

*Attest:*

NICHOLAS P. GODICI

*Attesting Officer*    *Acting Director of the United States Patent and Trademark Office*